United States Patent
Nagai et al.

(10) Patent No.: US 8,954,350 B2
(45) Date of Patent: Feb. 10, 2015

(54) ORDER SUPPORTING APPARATUS, CONTROL METHOD FOR AN ORDER SUPPORTING APPARATUS, ORDER SUPPORTING SYSTEM, AND COMPUTER READABLE STORAGE MEDIUM

(75) Inventors: Keiji Nagai, Tokyo (JP); Yutaka Nakamura, Tokyo (JP); Koji Dan, Tokyo (JP); Masato Takahashi, Tokyo (JP); Yuuki Inoue, Tokyo (JP); Fujio Takahashi, Tokyo (JP); Yoshiaki Murata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1399 days.

(21) Appl. No.: 11/944,913

(22) Filed: Nov. 26, 2007

(65) Prior Publication Data

US 2008/0126228 A1 May 29, 2008

(30) Foreign Application Priority Data

Nov. 28, 2006 (JP) .................................. 2006-320474
May 16, 2007 (JP) .................................. 2007-130541

(51) Int. Cl.
*G06Q 10/00* (2012.01)
*G06Q 20/00* (2012.01)
(Continued)

(52) U.S. Cl.
CPC .............. *G06Q 10/00* (2013.01); *G06Q 20/203* (2013.01); *G06Q 10/08* (2013.01);
(Continued)

(58) Field of Classification Search
CPC ... G06Q 10/087; G06Q 20/203; G06Q 10/08; G06Q 10/0875; G06Q 10/06; G06Q 20/202; G06Q 20/20; G06Q 30/06; G06Q 30/02; G07G 1/14

USPC ....................................................... 705/28, 21
See application file for complete search history.

(56) References Cited

U.S. PATENT DOCUMENTS 5,293,310 A * 3/1994 Carroll et al. ............... 705/14.26
6,108,637 A * 8/2000 Blumenau ..................... 715/204
(Continued)

FOREIGN PATENT DOCUMENTS

JP 10-198236 7/1998
JP 2003-345560 12/2003

OTHER PUBLICATIONS

Library Pro, Anonymous, Library Technology Reports 35.4 Jul./Aug. 1999:pp. 424-438.*

*Primary Examiner* — Matthew Gart
*Assistant Examiner* — Harshad Parikh
(74) *Attorney, Agent, or Firm* — Oblon, Spivak, McClelland, Maier & Neustadt, L.L.P.

(57) ABSTRACT

An order supporting apparatus connected to a monitoring apparatus over a network, the monitoring apparatus determining a supply status of devices in the network and sends supply shortage information regarding at least one of the devices determined to have a supply shortage to the order supporting apparatus. In particular, the order supporting apparatus includes a device information storage part that stores device information describing whether each device is monitored as a monitoring target, and maintenance contract information of each device, and a determination part that determines, based on the device information, whether each device is subject to the maintenance contract when the order supporting apparatus receives the supply shortage information. Further, the determination part deselects, in the device information, a device as the monitoring target when the device is determined to have a supply shortage by the monitoring apparatus.

1 Claim, 23 Drawing Sheets

| MAC ADDRESS | | MODEL NAME | SERIAL NUMBER | MONI-TOR FLAG | MAINTE-NANCE CONTRACT NUMBER | CONTACT ADDRESS | SUPPLY STATUS | | | | | MAIL FLAG |
|---|---|---|---|---|---|---|---|---|---|---|---|---|
| | | | | | | | C | M | Y | K | Any | ... |
| 00.00.74.71.42.0a | A | A7200 | 123456 | No | | | N | N | N | N | N | ... | No |
| 00.30.c.1.00.04.43 | B | B LaserJet8500 | 00.30.c.1.00.04.43 | Yes | | | N | N | N | N | N | ... | No |
| 00.04.00.f0.0c.0e | C | CL2455 | 00.04.00.f0.0c.0e | Yes | | | N | N | N | N | N | ... | No |
| 00.10.83.a3.d4.1c | B | B LaserJet4050 | 00.10.83.a3.d4.1c | Yes | | | N | N | N | N | N | ... | No |
| 00.10.83.bb.57.0e | B | B LaserJet4050 | 00.10.83.bb.57.0e | Yes | | | N | N | N | N | N | ... | No |
| 00.30.c1.0c.f4.c7 | B | B LaserJet4050 | 00.30.c1.0c.f4.c7 | Yes | | | N | N | N | N | N | ... | No |
| 00.00.74.71.42.1b | A | A3228C | P6020101199 | Yes | | | N | N | N | N | N | ... | No |
| : | : | : | : | : | : | : | : | : | : | : | : | : | : |

VENDOR NAME ↑ COMMENTS ↑ 12

(51) Int. Cl.
  *G06Q 20/20* (2012.01)
  *G06Q 10/08* (2012.01)
  *G06Q 10/06* (2012.01)
  *G06Q 30/06* (2012.01)
  *G06Q 30/02* (2012.01)
  *G07G 1/14* (2006.01)

(52) U.S. Cl.
  CPC ........... *G06Q 10/0875* (2013.01); *G06Q 10/06* (2013.01); *G06Q 20/202* (2013.01); *G06Q 20/20* (2013.01); *G06Q 30/06* (2013.01); *G06Q 30/02* (2013.01); *G07G 1/14* (2013.01); *G06Q 10/087* (2013.01)
  USPC ............................................. 705/28; 705/21

(56) References Cited

U.S. PATENT DOCUMENTS

| | | | |
|---|---|---|---|
| 6,219,648 B1* | 4/2001 | Jones et al. | 705/7.39 |
| 6,982,657 B2* | 1/2006 | Kinugawa et al. | 385/39 |
| 7,020,624 B2* | 3/2006 | Hsuan | 705/26.81 |
| 7,249,030 B2* | 7/2007 | Sopko et al. | 705/305 |
| 7,295,990 B1* | 11/2007 | Braumoeller et al. | 705/7.31 |
| 7,532,346 B2* | 5/2009 | Naito | 358/1.15 |
| 7,805,330 B2* | 9/2010 | Johnson et al. | 705/7.29 |
| 7,945,470 B1* | 5/2011 | Cohen et al. | 705/7.13 |
| 8,069,097 B2* | 11/2011 | Patrick et al. | 705/28 |
| 2002/0116240 A1* | 8/2002 | Hsuan | 705/7 |
| 2002/0144007 A1* | 10/2002 | Shteyn | 709/313 |
| 2002/0165817 A1* | 11/2002 | Rackson et al. | 705/37 |
| 2003/0040924 A1* | 2/2003 | Spoke et al. | 705/1 |
| 2003/0053459 A1* | 3/2003 | Brouk et al. | 370/392 |
| 2003/0135381 A1* | 7/2003 | Mathiesen et al. | 705/1 |
| 2004/0122718 A1* | 6/2004 | Baumann et al. | 705/7 |
| 2004/0158499 A1* | 8/2004 | Dev et al. | 705/26 |
| 2005/0010323 A1* | 1/2005 | Cocciadiferro et al. | 700/174 |
| 2005/0015294 A1* | 1/2005 | Williams et al. | 705/10 |
| 2005/0216395 A1* | 9/2005 | Behmoiras et al. | 705/38 |
| 2005/0239495 A1* | 10/2005 | Bayne | 455/550.1 |
| 2006/0047532 A1* | 3/2006 | Kariv et al. | 705/1 |
| 2006/0218053 A1* | 9/2006 | Jimenez et al. | 705/26 |
| 2006/0218092 A1* | 9/2006 | Tedesco et al. | 705/40 |
| 2006/0224729 A1* | 10/2006 | Rowe et al. | 709/224 |
| 2006/0229947 A1* | 10/2006 | Rossides | 705/14 |
| 2006/0242022 A1* | 10/2006 | Hashimoto et al. | 705/14 |
| 2006/0259515 A1* | 11/2006 | Weinrich et al. | 707/104.1 |
| 2006/0259912 A1* | 11/2006 | Weinrich et al. | 719/315 |
| 2006/0282284 A1* | 12/2006 | Daniel et al. | 705/1 |
| 2006/0282317 A1* | 12/2006 | Rosenberg | 705/14 |
| 2006/0287881 A1* | 12/2006 | Fitzgerald et al. | 705/1 |
| 2007/0150480 A1* | 6/2007 | Hwang et al. | 707/10 |
| 2007/0229504 A1* | 10/2007 | Matsunaga et al. | 345/440 |
| 2007/0280118 A1 | 12/2007 | Takahashi et al. | |
| 2007/0288674 A1* | 12/2007 | Ikeno | 710/110 |
| 2008/0010306 A1 | 1/2008 | Nagai et al. | |
| 2008/0281731 A1* | 11/2008 | Takata et al. | 705/28 |
| 2010/0205104 A1* | 8/2010 | Johnson | 705/333 |
| 2011/0099120 A1* | 4/2011 | Grossman et al. | 705/325 |
| 2012/0209649 A1* | 8/2012 | Ovenden et al. | 705/7.15 |
| 2012/0278125 A1* | 11/2012 | Sriraghavan et al. | 705/7.27 |
| 2013/0090090 A1* | 4/2013 | Rivere | 455/411 |
| 2013/0090966 A1* | 4/2013 | Rivere | 705/7.15 |
| 2013/0090969 A1* | 4/2013 | Rivere | 705/7.19 |
| 2013/0167003 A1* | 6/2013 | Mueller et al. | 715/221 |
| 2013/0215116 A1* | 8/2013 | Siddique et al. | 345/420 |

* cited by examiner

FIG. 4

USER REGISTRATION PAGE

| | |
|---|---|
| CUSTOMER NAME | ⬜ 221 |
| REQUISITE) POSTAL CODE | ⬜ 222 |
| REQUISITE) ADDRESS | ⬜ 223 |
| REQUISITE) COMPANY NAME | ⬜ 224 |
| DEPARTMENT NAME | ⬜ 225 |
| REQUISITE) TELEPHONE NUMBER | ⬜ 226 |
| FACSIMILE NUMBER | ⬜ 227 |
| REQUISITE) E-MAIL ADDRESS | ⬜ 228 |

DELIVERY DESTINATION
(PLEASE INDICATE IF DIFFERENT FROM ABOVE ADDRESS)

| | |
|---|---|
| POSTAL CODE | ⬜ |
| ADDRESS | ⬜ } 231 |
| COMPANY NAME | ⬜ |
| DEPARTMENT NAME | ⬜ |
| REQUISITE) DISTRIBUTOR ID | ⬜ 232 |

[REGISTER] 233

| MAC ADDRESS | VENDOR NAME | MODEL NAME | SERIAL NUMBER | MONI-TOR FLAG | COMMENTS ‹ MAINTE-NANCE CONTRACT NUMBER | CONTACT ADDRESS | ... | SUPPLY STATUS C | M | Y | K | Any | ... | MAIL FLAG |
|---|---|---|---|---|---|---|---|---|---|---|---|---|---|---|
| 00.00.74.71.42.0a | A | A7200 | 123456 | No | | | | N | N | N | N | N | ... | No |
| 00.30.c.1.00.04.43 | B | B LaserJet8500 | 00.30.c.1.00.04.43 | Yes | | | | N | N | N | N | N | ... | No |
| 00.04.00.f0.0c.0e | C | CL2455 | 00.04.00.f0.0c.0e | Yes | | | | N | N | N | N | N | ... | No |
| 00.10.83.a3.d4.1c | B | B LaserJet4050 | 00.10.83.a3.d4.1c | Yes | | | | N | N | N | N | N | ... | No |
| 00.10.83.bb.57.0e | B | B LaserJet4050 | 00.10.83.bb.57.0e | Yes | | | | N | N | N | N | N | ... | No |
| 00.30.c1.0c.f4.c7 | B | B LaserJet4050 | 00.30.c1.0c.f4.c7 | Yes | | | | N | N | N | N | N | ... | No |
| 00.00.74.71.42.1b | A | A3228C | P6020101199 | Yes | | | | N | N | N | N | N | ... | No |
| ... | ... | | ... | ... | | | ... | ... | ... | ... | ... | ... | ... | ... |

RETRIEVED DEVICE LIST 240

| # | SERIAL NUMBER | MAC ADDRESS | IP ADDRESS | MODEL NAME | VENDOR NAME | COMMENTS 241 | MONITOR TARGET 242 | MAINTENANCE CONTRACT NUMBER 243 | CONTACT ADDRESS 244 |
|---|---|---|---|---|---|---|---|---|---|
| 1 | 123456 | 00.00.74.71.42.0a | xxxxxxxxxx | A7200 | A | | ☐ | | |
| 2 | 00.30.c1.00.04.43 | 00.30.c1.00.04.43 | xxxxxxxxxx | B LaserJet8500 | B | | ☑ | | |
| 3 | 00.04.00.f0.0c.0e | 00.04.00.f0.0c.0e | xxxxxxxxxx | CL2455 | C | | ☑ | | |
| 4 | 00.10.83.a3.d4.1c | 00.10.83.a3.d4.1c | xxxxxxxxxx | B LaserJet4050 | B | | ☑ | | |
| 5 | 00.10.83.bb.57.0e | 00.10.83.bb.57.0e | xxxxxxxxxx | B LaserJet4050 | B | | ☑ | | |
| 6 | 00.30.c1.0c.f4.c7 | 00.30.c1.0c.f4.c7 | xxxxxxxxxx | B LaserJet4050 | B | | ☑ | | |
| 7 | P6020101199 | 00.00.74.71.42.1b | xxxxxxxxxx | A3228C | A | | ☑ | | |

[TRANSMIT] 245

FIG. 7

| MAC ADDRESS | VENDOR NAME | MODEL NAME | SERIAL NUMBER | MONITOR FLAG | COM-MENTS | MAINTENANCE CONTRACT NUMBER | CONTACT ADDRESS | ... | SUPPLY STATUS | | | | | MAIL FLAG |
|---|---|---|---|---|---|---|---|---|---|---|---|---|---|---|
| | | | | | | | | | C | M | Y | K | Any | |
| 00.00.74.71.42.0a | A | A7200 | 123456 | Yes | OOMORI 4F | 123456 | hoshu@abc.xyz | | N | N | N | N | ... | No |
| 00.30.c1.00.04.43 | B | LaserJet8500 | 00.30.c1.00.04.43 | Yes | | | | | N | N | N | N | ... | No |
| 00.04.00.f0.0c.0e | C | CL2455 | 00.04.00.f0.0c.0e | Yes | | | | | N | N | N | N | ... | No |
| 00.10.83.a3.d4.1c | B | LaserJet4050 | 00.10.83.a3.d4.1c | Yes | | | | | N | N | N | N | ... | No |
| 00.10.83.bb.57.0e | B | LaserJet4050 | 00.10.83.bb.57.0e | No | | | | | N | N | N | N | ... | No |
| 00.30.c1.0c.f4.c7 | B | LaserJet4050 | 00.30.c1.0c.f4.c7 | No | | | | | N | N | N | N | ... | No |
| 00.00.74.71.42.1b | A | A3228C | P6020101199 | No | | | | | N | N | N | N | ... | No |
| .. | .. | .. | .. | .. | | | | | .. | .. | .. | .. | .. | .. |

| MAC ADDRESS | VENDOR NAME | MODEL NAME | SERIAL NUMBER | MONITOR FLAG | COMMENTS | MAINTENANCE CONTRACT NUMBER | CONTACT ADDRESS | ... | SUPPLY STATUS | | | | | MAIL FLAG |
|---|---|---|---|---|---|---|---|---|---|---|---|---|---|---|
| | | | | | | | | | C | M | Y | K | Any | |
| 00.00.74.71.42.0a | A | A7200 | 123456 | Yes | OOMORI 4F | 123456 | hoshu@abc.xyz | ... | N | N | N | N | ... | No |
| 00.30.c1.00.04.43 | B | B LaserJet8500 | 00.30.c1.00.04.43 | Yes | | | | ... | N | N | N | N | ... | No |
| 00.04.00.f0.0c.0e | C | CL2455 | 00.04.00.f0.0c.0e | Yes | | | | ... | N | N | N | N | ... | No |
| 00.10.83.a3.d4.1c | B | B LaserJet4050 | 00.10.83.a3.d4.1c | Yes | | | | ... | N | N | N | N | ... | No |
| 00.10.83.bb.57.0e | B | B LaserJet5000 | 00.10.83.bb.57.0e | Yes | | | | ... | N | N | N | N | ... | No |
| 00.30.c1.0c.f4.c7 | B | B LaserJet4050 | 00.30.c1.0c.f4.c7 | No | | | | ... | N | N | N | N | ... | No |
| 00.00.74.71.42.1b | A | A3228C | P6020101199 | No | | | | ... | N | N | N | N | ... | No |
| .. | .. | .. | .. | .. | | | | ... | .. | .. | .. | .. | ... | .. |

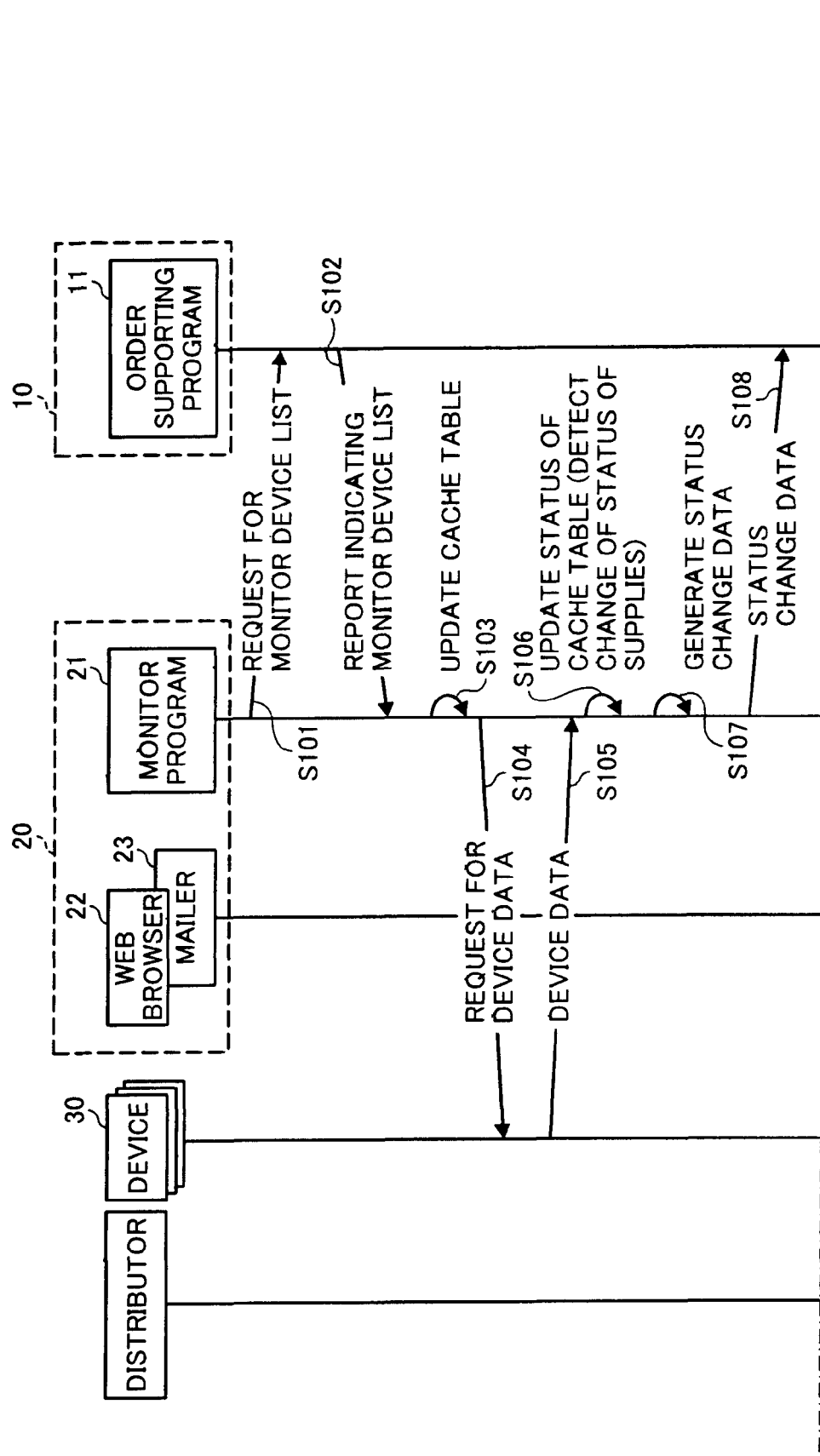

FIG. 11

| MAC ADDRESS | VENDOR NAME | MODEL NAME | SERIAL NUMBER | COMMENTS | MONITOR STATUS | SUPPLY STATUS | REPORT FLAG |
|---|---|---|---|---|---|---|---|
| 00.00.74.71.42.0a | A | A7200 | 123456 | OOMORI 4F | OK | normal | REPORTED |
| 00.30.c.1.00.04.43 | B | B LaserJet8500 | 00.30.c.1.00.04.43 | | OK | normal | REPORTED |
| 00.04.00.f0.0c.0e | C | CL2455 | 00.04.00.f0.0c.0e | | OK | end | UNREPORTED |
| 00.10.83.a3.d4.1c | B | B LaserJet4050 | 00.10.83.a3.d4.1c | | OK | near end | REPORTED |
| 00.10.83.bb.57.0e | B | B LaserJet5000 | 00.10.83.bb.57.0e | | OK | near end | REPORTED |

FIG. 12

| MAC ADDRESS | VENDOR NAME | MODEL NAME | SERIAL NUMBER | COMMENTS | MONITOR STATUS | SUPPLY STATUS | REPORT FLAG |
|---|---|---|---|---|---|---|---|
| 00.00.74.71.42.0a | A | A7200 | 123456 | OOMORI 4F | OK | near end | UNREPORTED |
| 00.30.c.1.00.04.43 | B | B LaserJet8500 | 00.30.c.1.00.04.43 | | NG | normal | REPORTED |
| 00.04.00.f0.0c.0e | C | CL2455 | 00.04.00.f0.0c.0e | | OK | end | UNREPORTED |
| 00.10.83.a3.d4.1c | B | B LaserJet4050 | 00.10.83.a3.d4.1c | | OK | end | UNREPORTED |
| 00.10.83.bb.57.0e | B | B LaserJet5000 | 00.10.83.bb.57.0e | | OK | near end | REPORTED |

FIG. 13

| REPORT DATA | COMMENTS | FOOTNOTE |
|---|---|---|
| [ Header ] | 【HEADER DATA】 | |
| Date&Time | DATE AND TIME | |
| User ID | USER ID FOR TRANSMITTING TO SERVER | DATA IDENTIFYING USER |
| Password | PASSWORD FOR TRANSMITTING TO SERVER | |
| | | |
| [Device Info] | 【DEVICE DATA】 | |
| Vendor name | VENDOR NAME OF DEVICE | |
| Model name | MODEL NAME OF DEVICE | |
| Serial Number | SERIAL NUMBER | |
| Mac Address | MAC ADDRESS | |
| IP Address | IP ADDRESS | |
| Toner ID | TONER ID | |
| Toner Name | TONER NAME | |
| Toner Status | TONER STATUS | |
| Toner Level | TONER LEVEL | |
| Toner Name Localized | TONER NAME (CHARACTER STRING) | |
| Toner Name Localized Code | TONER NAME (CODE) | |
| Total Counter | TOTAL COUNTER VALUE | |
| Monochrome Counter | MONOCHROME COUNTER VALUE | (*1) |
| Color Counter | COLOR COUNTER VALUE | (*1) |
| Cyan Counter | CYAN COUNTER VALUE | (*1) |
| Magenta Counter | MAGENTA COUNTER VALUE | (*1) |
| Yellow Counter | YELLOW COUNTER VALUE | (*1) |
| Black Counter | BLACK COUNTER VALUE | (*1) |
| Red Counter | RED COUNTER VALUE | (*1) |

FIG. 15

| MAC ADDRESS | VENDOR NAME | MODEL NAME | SERIAL NUMBER | COMMENTS | MONITOR STATUS | SUPPLY STATUS | REPORT FLAG |
|---|---|---|---|---|---|---|---|
| 00.00.74.71.42.0a | A | A7200 | 123456 | OOMORI 4F | OK | near end | REPORTED |
| 00.30.c.1.00.04.43 | B | B LaserJet8500 | 00.30.c.1.00.04.43 | | NG | normal | REPORTED |
| 00.04.00.f0.0c.0e | C | CL2455 | 00.04.00.f0.0c.0e | | OK | end | REPORTED |
| 00.10.83.a3.d4.1c | B | B LaserJet4050 | 00.10.83.a3.d4.1c | | OK | end | REPORTED |
| 00.10.83.bb.57.0e | B | B LaserJet5000 | 00.10.83.bb.57.0e | | OK | near end | REPORTED |

ORDER PAGE

CONSUMABLE SUPPLY OF BELOW DEVICE IS SHORT

| MANUFACTURER NAME | MODEL NAME | SERIAL NUMBER | COMMENTS |
|---|---|---|---|
| A | A 7200 | 123456 | SOUTH SIDE 6F |

261

SHORT CONSUMABLE SUPPLY
A IP TONER (YELLOW)  }262

PLEASE ENTER NUMBER OF ITEMS OF NECESSARY SUPPLIES
※PRODUCT INFO. CAN BE VIEWED BY CLICKING PRODUCT NAME  262

| PRODUCT NAME | PRODUCT CODE | UNIT COST (TAX EXCLUDED) | QUANTITY | SUM |
|---|---|---|---|---|
| A IP TONER (CYAN) | 636341 | ¥27,000 | [0] | ¥0 |
| A IP TONER (MAGENTA) | 636340 | ¥27,000 | [0] | ¥0 |
| A IP TONER (YELLOW) | 636339 | ¥27,000 | [1] 2621 | ¥28,350 |
| A IP TONER (BLACK) | 636338 | ¥32,000 | [0] | ¥0 |
| A DEVELOPMENT UNIT COLOR TYPE 7200 | 509626 | ¥22,500 | [0] | ¥0 |
| A FIXING OIL UNIT TYPE 7200 | 509259 | ¥6,000 | [0] | ¥0 |

[ORDER] 2622              TOTAL ¥28,350

PURCHASE HISTORY FOR SUPPLIED OF A A 7200
(S/N:123456)
2005/12/10 A IP TONER (CYAN)       ONE ITEM    ORDERED
2005/11/21 A IP TONER (MAGENTA)    ONE ITEM  }263 DELIVERED
2005/09/30 A IP TONER (BLACK)      ONE ITEM    DELIVERED

ORDER SUPPORTING APPARATUS, CONTROL METHOD FOR AN ORDER SUPPORTING APPARATUS, ORDER SUPPORTING SYSTEM, AND COMPUTER READABLE STORAGE MEDIUM

CROSS-REFERENCE TO RELATED APPLICATIONS

This application claims the benefit of Japanese Patent Application No. 2006-320474, filed Nov. 28, 2006, and Application No. 2007-130541, filed May 16, 2007, in the Japanese Patent Office. The above applications are incorporated herein by reference.

BACKGROUND OF THE INVENTION

1. Field of the Invention

The present invention provides an order supporting system, an order supporting method, and a recording medium, and more particularly an order supporting system, an order supporting method, and a recording medium for supporting the ordering of supplies of devices.

2. Description of the Related Art

Inside an office of a company, numerous devices, such as a printer, a copy device, a fax device, or a multi-function peripheral (MFP) having the functions of the foregoing devices, are connected via a network.

All the above-described devices include consumable supplies that are consumed when using the devices. The functions of the devices can be maintained by appropriately exchanging the consumable supply (hereinafter also referred to as "supply"). For example, a consumable supply for a printer may be a toner, a fixing unit, a disposal toner bottle, a photoconductor, or a developer.

Since it is difficult to determine the degree of consumption of the devices just by looking at the devices from the outside, the user is able to recognize shortage of a supply, such as toner, and the need to exchange the toner only when an error is reported to the user upon commanding a printing operation. In order to reduce the workload of the user, various approaches, for example, a device that detects the supply duration and displays or prints information regarding the supply, a device that recognizes a shortage of the supply and sends a signal notifying the supply needs to be changed to a customer center, or a device that automatically orders the supply according to remaining amount, have been proposed.

However, the situation of supply provision varies according to each device or each maintenance contract. For example, the following case is assumed. Although the user does not have to purchase supplies for an MFP, the use typically concludes a maintenance contract for the MFP that includes the supply provision and delivery cost of the supply. However, the user has to purchase supplies for a stand-alone device, such as a facsimile device, printer, or copier, when necessary.

In such a situation, the user may have to purchase the overlapping supply regarding the stand-alone devices that is included in the maintenance contract, even if the device automatically detects a shortage of the supply or orders the supply. That is, a problem of double-ordering of supplies may occur.

SUMMARY OF THE INVENTION

The present invention provides an order supporting system, an order supporting method, and a recording medium that substantially obviates one or more of the problems caused by the limitations and disadvantages of the related art.

Thus, according to one aspect of the present invention, there is provided an order supporting apparatus connected to a monitoring apparatus over a network, the monitoring apparatus configured to determine a supply status of a plurality of devices in the network and to send supply shortage information regarding at least one of the devices determined to have a supply shortage to the order supporting apparatus, the order supporting apparatus comprising: (1) a device information storage part configured to store device information describing whether each device is monitored as a monitoring target, and maintenance contract information of each device; and (2) a determination part configured to determine, based on the device information, whether each device is subject to the maintenance contract when the order supporting apparatus receives the supply shortage information, wherein the determination part is configured to deselect a device as the monitoring target when the device is determined to have a supply shortage by the monitoring apparatus.

BRIEF DESCRIPTION OF THE DRAWINGS

FIG. 4 shows an example of the user registration page;
FIG. 5 shows an example of a device information table;
FIG. 6 shows an example of a searched device information list page;
FIG. 7 shows an example of a device information table;
FIG. 9 shows an example of updated device information table;
FIG. 10A and 10B show an example of a diagram executed by an order supporting system;
FIG. 11 shows an example of a cache table;
FIG. 12 shows an example of updating a cache table;
FIG. 13 shows an example of status change information;
FIG. 15 shows an example of an updated cache table;
FIG. 16 shows an example of a supply order page.

DESCRIPTION OF THE PREFERRED EMBODIMENTS

In the following, embodiments of the present invention will be described with reference to the accompanying drawings.

Figure 1:
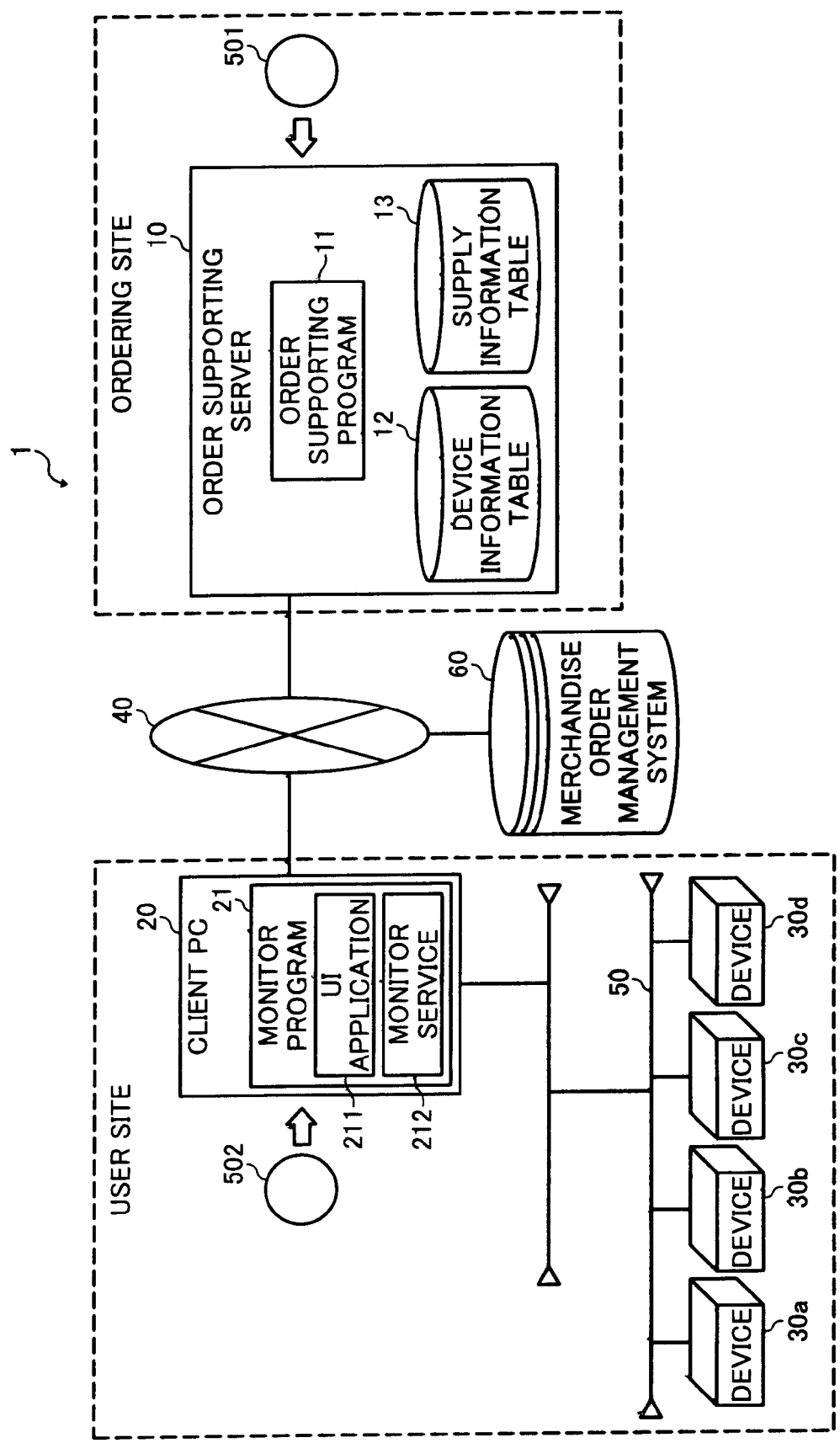
FIG. 1 shows an example of an order supporting system.

FIG. 1 shows an example of an order supporting system. In FIG. 1, the order supporting system 1 includes, for example, an order supporting server 10, a client PC 20, and plural devices 30a, 30b, 30c, 30d (hereinafter also generically referred to as "device 30"), an Internet 40, LAN 50, and a merchandise order management system 60.

The order supporting server 10 is located in an ordering site (i.e., the supplier side providing the consumable supplies of the device 30). The client PC 20 and the device 30 are located in an user site, such as a user office. The order supplying server 10 and the client PC 20 are connected via the Internet 40. Furthermore, the client PC 20 and the device 30 are connected via a LAN (Local Area Network) 50 connected to the user site. Regarding the LAN 40 and Internet 50, they may be another kind of a network such as a WAN (Wide Area Network).

The device 30 may be an image forming apparatus, such as a typical printer or a multi-function device which consumes various supplies such as toner and ink. In this example, the device 30 corresponds to an MIB (Managed Information Base). The device 30 can respond to requests for obtaining MIB information received via a network according to SNMP (Simple Network Management Protocol). Furthermore, the device 30 can detect status information of consumable supplies. The status information may be qualitative information (normal, near-end, end) or quantitative information (100%, 90%, . . . , 10%, 0%).

The client PC 20 may be a general computer having a monitor program 21 installed therein. The monitor program 21 may be installed from a recording medium 502 (e.g., CD-ROM) or downloaded from a network. In the below-described embodiment of the present invention, the monitor program 21 is downloaded from a network 40.

The monitor program 21 includes a UI application 211 and a monitor service 212. The UI application 211 is activated as a process separate from the monitor service 212. The UI application 211 provides a GUI (Graphical User Interface) for indicating functions of the monitor service 212. For example, the UI application 211 provides a screen for setting set-up information of the monitor service 212 or a screen for displaying device information obtained by the monitor service 212.

The monitor service 212 is a program activated as a daemon process. By loading the monitor service 212 in the memory of the client PC 20 and processing the program with the CPU, the client PC 20 performs the below-described functions.

The merchandise order management system 60 will be described below.

Figure 2:
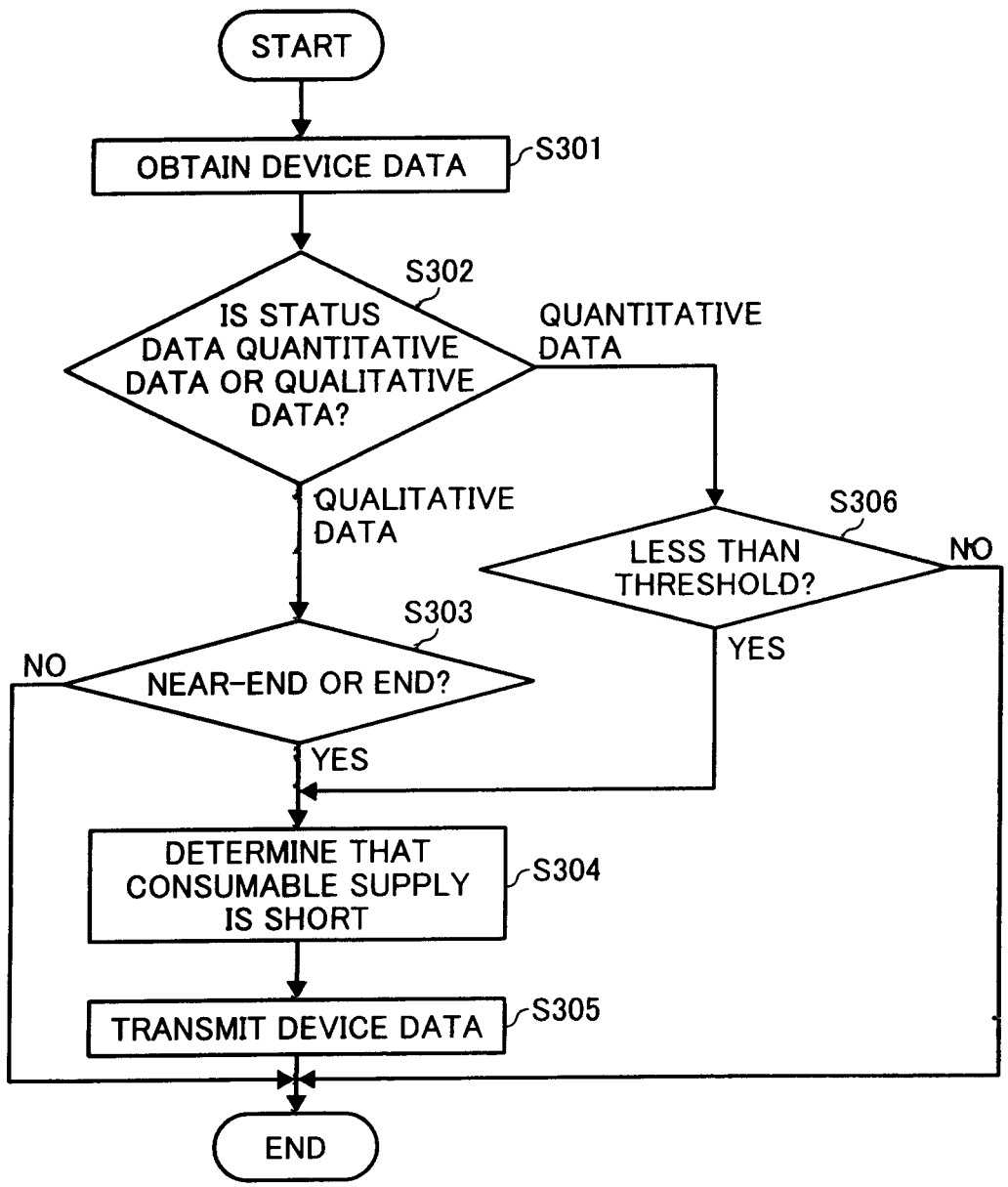
FIG. 2 shows an example of a flowchart executed by a client PC.

FIG. 2 shows a flowchart describing functions executed by the client PC 20 in accordance with the monitor service 212. In FIG. 2, the client PC 20 periodically obtains device information such as MIB information from each device 30 at step S301. The device information includes information for identifying the status of the consumable supply (or supplies) used by the device 30, (i.e., status information. For example, the status information may include toner status or total counter value, such as total number times of printing a page. The status information may also include information indicating the status of other consumable supplies, such as a fixing unit, a disposal toner bottle, a photoconductor, or a developer.

If status information of a consumable supply included in the obtained device information is "qualitative information" at step S302 (i.e. information indicative of normal/near-end/end), the process proceeds to next step S303.

In step S303, when the qualitative information are near-end information or end information (hereinafter also generically referred to as "end information"), the process proceeds to the next step and it is determined that the consumable supply is short, in step S304. Then, the device information of the device 30 is sent to the order supporting server 10 in step S305.

Meanwhile, if status information of a consumable supply included in the obtained device information is "quantitative information" at step S302 (i.e. information indicative of 100%, 90%, . . . , 10%, 0%), the process proceeds to the next step S306.

In step S306, it is determined whether the quantity of the consumable supply is below a predetermined threshold, for example, not greater than 30%. If the quantitative information is below the predetermined threshold, the process proceeds to step S304. On the other hand, if the quantitative information is not below the predetermined threshold, the process ends.

Although the above flowchart shows that the monitor apparatus 20 detects whether there is a shortage of consumable supplies, the detection may be performed by the order supporting server 10. In such a case, the monitor apparatus 20 transmits device information of all of the devices 30. Therefore, from the aspect of reducing the traffic load of the network, it may be possible to transmit device information of only those devices from which a shortage is detected by the monitor apparatus 20.

The client PC 20 may also have installed an e-mail software for transmitting and receiving an e-mail or a Web browser for browsing Web pages.

The order supporting server 10 may be a general purpose computer including a function of a Web server with an order supporting program 11 installed therein. The order supporting program 11 may be installed from a recording medium 501 (e.g., CD-ROM) or downloaded from a network.

By loading the order supporting program 11 in the memory of the order supporting server 10 and processing the program with the CPU, the order supporting server 10 performs the below-described functions. That is, an e-mail generating part of the order supporting server 10 generates an e-mail for instructing re-supply of a short consumable supply based on device information received from the client PC 20 and sends the e-mail to a pre-registered e-mail address of the user. A URL for a Web page dedicated to ordering the short consumable supply (hereinafter referred to as "supply order page") is described in the sent e-mail. In response to an HTTP request sent based on the clicking of the URL, the order supporting server 10 returns a supply order page. Then, the order supporting server 10 receives a supply order request requesting the consumable supply based on the supply order page. The order supporting server 10, in response to the supply order request, sends supply order instructions to order the consumable supply to an external merchandise order management system, as described below.

Further, the order supporting server 10 includes a device information table 12 and a supply information table 13 therein. Regarding the device information table 12 and a supply information table 13, description will be given below.

Figure 3:
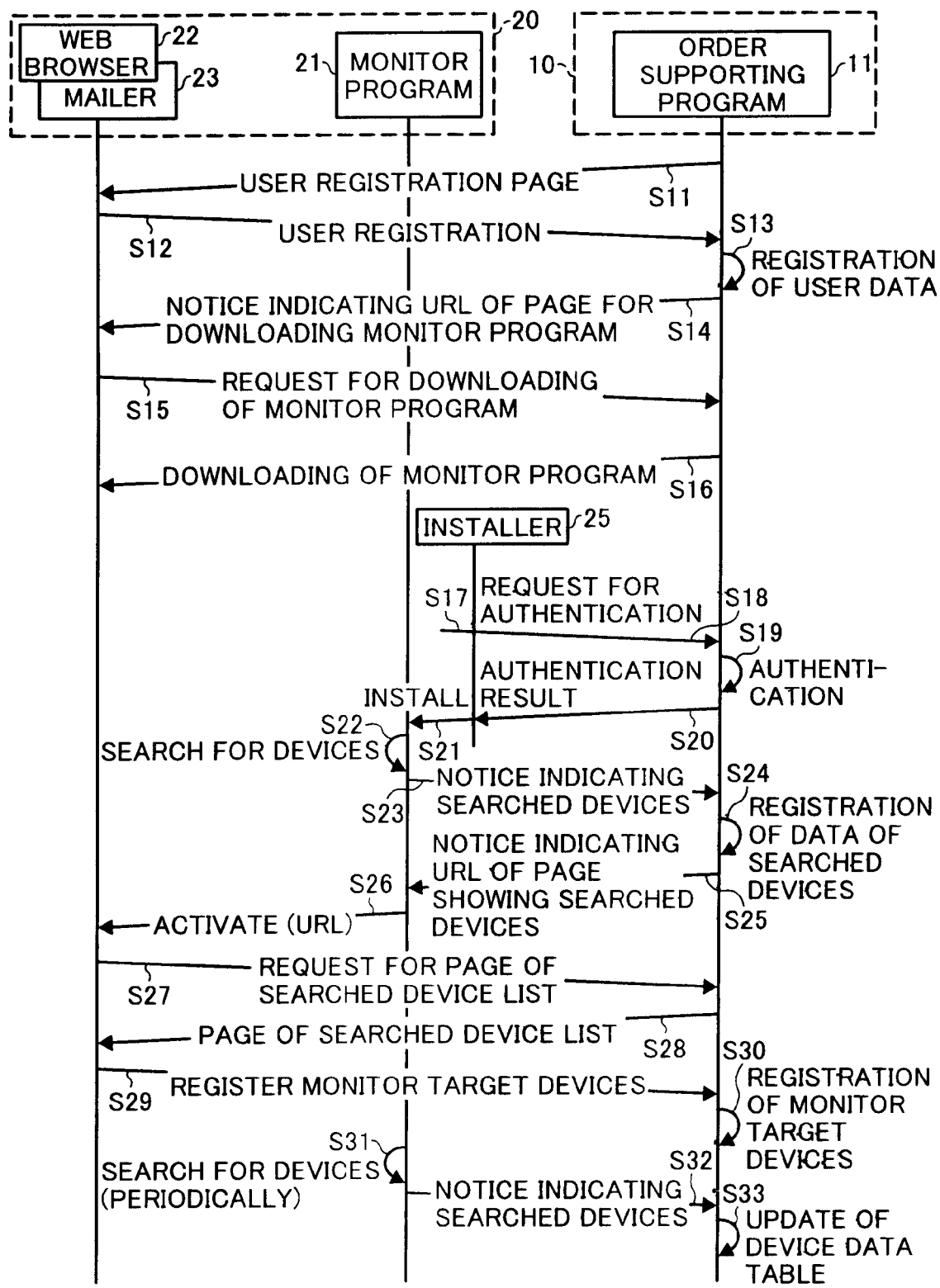
FIG. 3 shows an example of a diagram regarding processing of user registration with the order supporting system.

FIG. 3 shows an example of a diagram regarding processing of user registration with the order supporting system 1. In FIG. 3, the Web browser 22 is a general purpose Web browser installed in the client PC 20. Furthermore, the e-mailer program 23 is a general e-mailer program installed in the client PC 20.

First, the user obtains an ID used for accessing the order supporting server 10 (hereinafter referred to as "access ID") during registration of the contract and a URL of the order supporting server 10 from a distributor. Then, the user inputs the URL to the Web browser 22. In response to the input of the URL, input of the access ID is requested of the user. If an appropriate access ID is input, a Web page used for user registration (hereinafter referred to as "user registration page") is sent from the order supporting server 10 to the Web browser 22 at step S11. The Web browser 22 receiving the user registration page from the order supporting server 10 displays the received user registration page.

FIG. 4 shows an example of the user registration page. In the below description of FIG. 4, the numerals indicated in the parenthesis correspond to the reference numerals shown in FIG. 4. As shown in FIG. 4, basic information such as the name 221, the postal code 222, the address 223, the company name 224, the department name 225, the telephone number 226, the facsimile number 237, and the e-e-mail address 228 of the user can be input in the user registration page 220.

Furthermore, destination information 231 regarding the destination to which the consumable supply is to be delivered (e.g., postal code, address, company name, and department name of delivery destination) and distributor ID 232 can also be input to the user registration page 220. In this example, the distributor ID is an ID of the distributor serving as the associate of the registration contract concluded by the user. The distributor ID is reported to the distributor upon registration of the contract.

The user inputs necessary items in the user registration page 220. Then, when the user clicks a register button 233, the Web browser 22 sends an HTTP request to the order supporting server 10 for requesting user registration at step S12. The HTTP request includes information input to the user registration page 220 (hereinafter referred to as "user information" including the distributor ID).

When the order supporting server 10 receives the HTTP request, the order supporting program 11 of the order supporting server 10 registers the user information included in the HTTP request in a predetermined data base (hereinafter referred to as "user data base") at step S13. In registering the user information, the order supporting program 11 determines whether the distributor ID included in the user information is stored in the order supporting server 10. If there is an entry corresponding to the distributor ID, the order supporting program 11 generates or assigns a user ID and a password corresponding to the user. Thus, the order supporting program 11 registers the user information including the user ID and the password in the user database.

Then, the order supporting program 11 sends an e-mail having predetermined information described in its main text (hereinafter referred to as "install information report e-mail") to the e-mail address of the user at step S14. The predetermined information in the e-mail includes, for example, the URL of a Web page for enabling downloading by the monitor program 21 (hereinafter referred to as "download page") and the user ID and the password generated by the order supporting program 11.

Furthermore, the order supporting program 11 includes a Web page used for displaying a message indicating that the install information report has been sent inside the HTTP response corresponding to the HTTP request at step S12, and sends the HTTP response to the Web browser 22. Through the sent Web page, the user can acknowledge that the install information report e-mail has been sent to the user. By using the e-mailer 23, the user can browse the install information report e-mail and confirm various information such as the URL of the download page and the user ID and password assigned to the user.

It is to be noted that the reporting of the information (e.g., URL of the download page) is not limited to an approach of transmitting an e-mail. For example, as an alternative to transmitting a Web page indicating a message reporting the transmission of the install information report e-mail, the download page may be sent to the user at step S14. Although, if the download page is sent at step S14, it becomes necessary to successively proceed to an installing process. According to the install information report e-mail, the installing process can be conducted in convenient time for the user once the install information report information is received. Furthermore, such information may also be sent by facsimile or postal e-mail.

When the user clicks the URL of the download page indicated in the install information report e-mail, the e-mailer 23 activates the Web browser 22 using the URL as an argument (ARG). When the Web browser 22 is activated, the Web browser 22 displays the download page based on the URL. When the user clicks a URL of a download destination displayed in the download page, the Web browser 22 sends a request for downloading the monitor program 21 (download request) to the order supporting server 10 at step S15. In response to the download request, the order supporting program 11 transfers an installment package of the monitor program 21 stored in the order supporting server 10 to the client PC 20 at step S16.

The user activates an installer 25 included in the installment package downloaded from the order supporting server 10 at step S17. When the installer 25 is activated, the installer 25 requests the user to input predetermined information such as the user ID and the password indicated in the install information report e-mail. When the user inputs the predetermined information including the user ID and password, the installer 25 sends the input user ID and the password to the order supporting server 10 and requests the order supporting server 10 to authenticate the user at step S18. It is to be noted that the input user ID and password are also stored and managed in the client PC 20.

The order support program 11 performs authentication of the user by comparing the user ID and the password sent from the installer 25 with the user ID and the password registered in the user data base at step S19. The order supporting program 11 sends the authentication result to the monitor program 21 at S20. The installer 25 installs the monitor program 21 at step S21 when the authentication succeeds. The installer 25 cancels the installing process when the authentication fails.

Since the installing process is conducted only when the user is successfully authenticated, the install package can be prevented from being installed by a user who illicitly obtains the install package. The monitor program 21 is for communicating with the order supporting program 11 via a network. Thus, from the aspect of preventing an unauthorized user from attacking the order supporting server 10 via the network, it is effective to perform user authentication prior to installment for preventing an unauthorized user from using the monitor program 21.

After the installing process is completed, a monitor service 212 of the monitor program 21 is initiated in the client PC 20. First, the monitor service 212 searches for devices 30 connected to a network 50 at step S22. Then, the monitor service 212 sends information of all of the devices 30 found in the search, such as a serial number, a MAC address, a model name, and a vendor name (e.g.; a name of manufacturer of device), and device category (hereinafter referred to as "searched device information"), to the order supporting server 10 at step S23. Now, the device category is the kind of devices in the aspects of the device function, such as MFP, printer, copier, scanner, or facsimile device. It is to be noted that known approach may be used for searching for the devices 30 and obtaining searched device information through the network 50, such as using SNMP (Simple Network Management Protocol) and MIB.

The order supporting program 11 registers the searched device information sent from the monitor service 212 into a device information table 12 at step S24.

FIG. 5 shows an example of a device information table stored in the order supporting server 10. The device information table 12 shown in FIG. 5 is for registering and managing a MAC address, a vendor name, a model name, a serial number, a monitor flag, a comment, a maintenance contract number, a contact address, a supply status, and a e-mail flag in correspondence with each device 30 found in the search. The MAC address, the vendor name, the model name, and the serial number are registered as they are according to corresponding information in the searched device information. In addition, although other information such as an IP address is registered, such information is not shown in FIG. 5 for the sake of convenience.

The monitor flag is information indicating whether the device 30 is a target for monitoring by the monitor service 212. In case the device 30 is a monitor target, the monitor flag of the device 30 is registered as "Yes". If the device 30 is not a monitor target, the monitor flag of the device 30 is registered as "No". It is to be noted that the monitor flag is initially registered as "Yes". Alternatively, the initial value of the monitor flag may be "Null" (blank). However, regarding the device 30 whose category is MFP, the initial value of the monitor flag is registered as "No", because it may be possible that a maintenance contract may be concluded when the maintenance object is an MFP.

Now, the maintenance contract in this embodiment is another contract of a registration for the order supporting system 1 described as shown in FIG. 4. For example, the maintenance contract is the one in which the user can be assured to receive the supply without paying the fee again by paying a predetermined fee conducted in the contract periodically. On the other hand, the order supporting system 1 is a supporting system that supports works by the user for ordering the supply and charges the user for ordering the supply despite the maintenance contract, in case the supply is ordered based on the supply ordering system 1. Therefore, if the supply of the device 30 that is subject to the maintenance contract is ordered based on the order supporting system 1, it may happen that the user is charged a fee that need not be paid. So, deselecting the MFP that may be subject to the maintenance contract from the monitor target in the order supporting system 1 will reduce the possibility that the user is double-charged the supply fee. Actually, in the first line of the device information table 12 as shown in FIG. 5, the device 30 whose model name is "model A 7200" is the MFP and therefore the flag of the model A 7200 is set to "No".

Although this embodiment explains that MFP is an example of a category that may be subject to the maintenance contract, in case another category's device may be subject to the maintenance contract, the initial value of the monitor flag may be set "No". In addition, if it is possible to recognize the possibility of the maintenance contract based on another attribute that can be obtained from the device except for the category, such as model name, the order supporting system 1 may recognize the device that may be subject to the maintenance contract based on that attribute.

The comments, maintenance contract number, and contact address in the device information table 12 are items that are input by the user through the process described below. The item "comment" in the table is for arbitrarily registering information desired to be associated to the device 30 by the user. The maintenance contract number is a number to identify each maintenance contract and is designated by each maintenance contract. The contact address is contact information of the maintenance staff, such as an e-mail address or telephone number.

The item "supply status" is for registering information identifying the status of a given consumable supply. In this example, the letters "N (Normal)", Ne (Near-End)", and "E (End)" are registered in the item "supply status". The initial value of the item "supply status" may be "N". Alternatively, the initial value of the supply status may be "Null" (blank)". The item "e-mail flag" is described below.

Next, the order supporting program 11 sends a URL of a Web page used for displaying a list of the searched device information (hereinafter referred to as "device search table page") to the monitor service 212 at step S25. The monitor service 212 activates the Web browser 22 using the URL sent from the order supporting program 11 as an argument at step S26. When the Web browser 22 is activated, the Web browser 22 sends an HTTP request for requesting the device search table page to the order supporting server 10 based on the URL designated by the argument at step S27. In response to the HTTP request sent from the Web browser 22, the order supporting program 11 generates a searched device information list page based on the information registered in the device information table 12 and sends the generated searched device information list page to the Web browser 22 at step S28.

FIG. 6 shows an example of a searched device information list page. In the below description of FIG. 6, the numerals indicated in the parenthesis correspond to the reference numerals shown in FIG. 6. As shown in FIG. 6, information such as a serial number, a MAC address, an IP address, a model name, and a vendor name corresponding to each device 30 found in the search are displayed in the searched device information list page 240. Furthermore, the searched device information list page 240 also includes a comment column 241 for inputting a comment, a check-box column 242 for enabling the user to choose whether the device 30 is a monitor target for monitoring by the monitor service 212, a maintenance contract number column 243 for enabling the user to input the maintenance contract number, and a contact address column 244 for enabling the user to input the contact information described above. That is, the user inputs a comment and selects a monitor target for each device 30 by using the searched device information list page 240. In this embodiment, a check-marked check box signifies that a corresponding device 30 is selected as a monitor target.

Meanwhile, an initial state of the check-box column 242 corresponds to the value of the monitor flag in the device information table 12. That is, the order supporting program 11 sets the state of the check-box column 242 based on the monitor flag in the device information table 12 when creating the device information list page 240. Therefore, in the device information list page 240, a check-box column corresponding to the device, that is, "model A 7200", in the first line is not checked. In addition, it may be possible to display the first line in another color from other line so that the user can distinguish easily that the device "model A 7200" is subject to the maintenance contract.

Although the user can arbitrarily input information in the comment column 241, it may be preferable to input information for accommodating the operation of exchanging the consumable supplies (e.g., location of the device 30). In addition, regarding the device 30 having a maintenance contract, the maintenance contract number is input in the maintenance contract column 243 and the contact information is input in the contact address column 244. Meanwhile, when naming the maintenance contract number and the contact address generically, they will be named as "maintenance contract information" hereinafter.

The maintenance contract information is input in corresponding column if the device 30 is set as a monitor target, that is, when the check-box column 242 is checked by the user. Therefore, the check-box column 242 corresponding to the device 30 may be checked automatically according to inputting the maintenance contract information by the user. In addition, regarding a line corresponding to the check-box column 242 that is not checked, it may be possible to keep the line inactive until the check-box column 242 is checked, and to be active after checking in the check-box column 242. Meanwhile, even if the device 30 having a the maintenance contract is set as subject to the maintenance contract, the double-charging of the supply for the device 30 can be prevented through the process described below.

After the user completes inputting of comments and selection of the monitor target for each device 30 in the searched device information list page 240, or selecting a transmit button 245 after inputting the maintenance contract information if necessary, the Web browser 22 sends a HTTP request to the order supporting server 10 for requesting the order supporting server 10 to register a corresponding comment and a monitoring necessity for each device 30, at step S29. Based on the HTTP request sent from the Web browser 22, the order supporting program 11 additionally registers the corresponding comment and the monitoring necessity for each device 30 in the device information table 12 at step S30. That is, the order supporting program 11 registers "Yes" in the monitor flag of the device information table 12 for a device 30 selected as a monitor target, and registers "No" in the monitor flag of the device information table 12 for a device 30 not selected as a monitor target.

FIG. 7 shows an example of the device information table indicating a monitoring necessity and a comment registered therein. In the device information table 12 shown in FIG. 7, a comment indicating location information "Oomori 4F" is registered in an entry of the first line. Furthermore, the devices 30 indicated in the entries of the first to fourth lines are registered as monitor targets and the devices 30 indicated in the entries of the fifth and seventh lines are deselected from being monitor targets. In addition, the device indicated in the first line has the maintenance contract information.

Thereby, the procedures executed upon user registration are completed. It is to be noted that the monitor program 21 may also add a monitor target in a process other than the installing process. For example, the monitor program 21 may register searched device information and display the searched device information list page for allowing the user to select a monitor target from a menu.

The monitor service 212 automatically repeats, for example, periodically, the process of searching for devices 30 connected to the network 50 after the selection of the monitor targets at step S31. Then, the monitor service 212 sends the searched device information of corresponding devices found by the search at step S32. The order supporting program 11 updates the device information table 12 based on the sent device information from the monitor service 212 at step S33. By periodically inspecting the configuration of the network 50 by searching through the devices 30 and updating the device information table 12 based on the inspection results, the possibility of inconsistency occurring between the content of the device information table 12 and the configuration of the network 50 is reduced.

Figure 8:
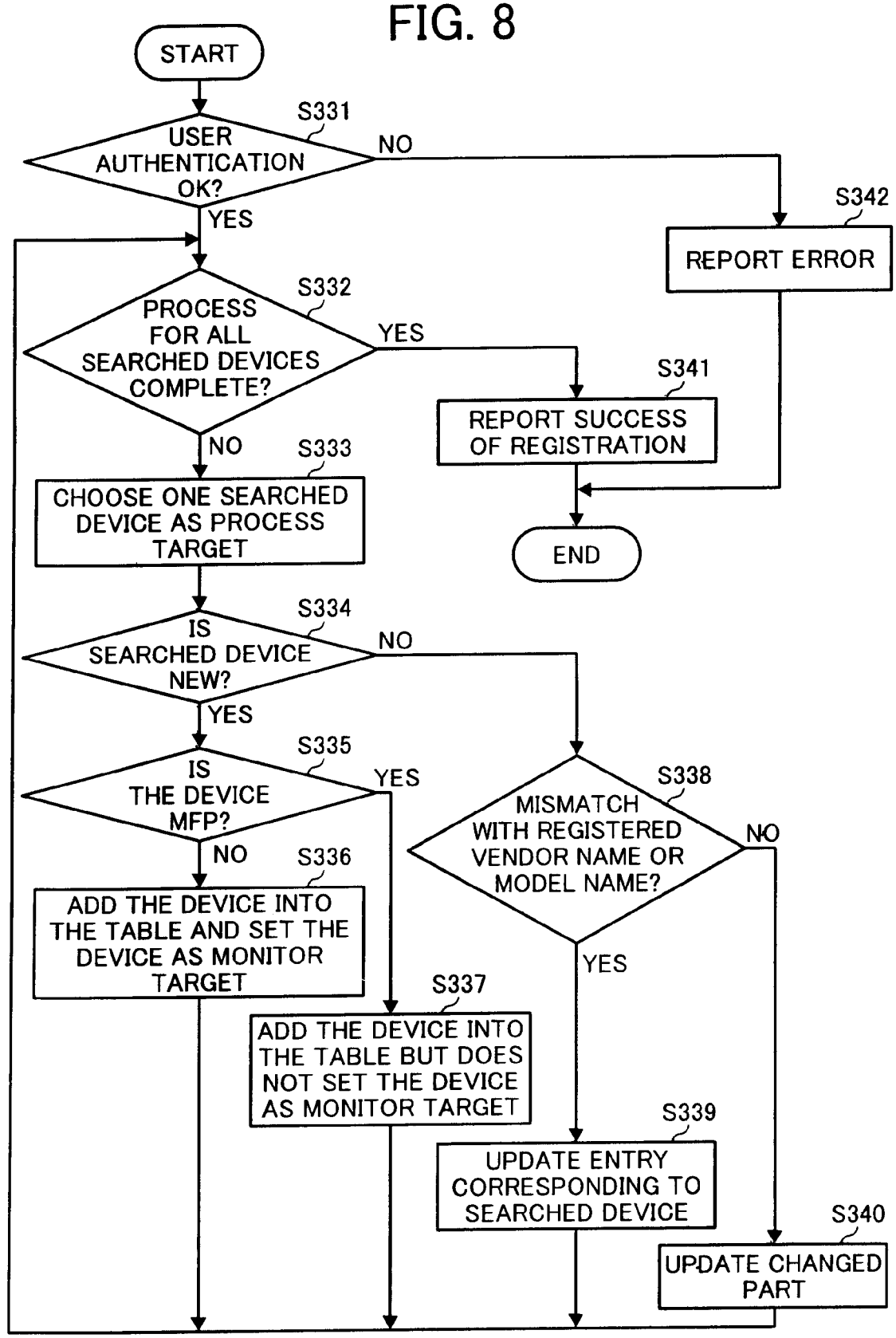
FIG. 8 shows an example of a flowchart regarding updating a device information table.

Next, a process of updating the device information table in Step S33 is described in detail. FIG. 8 shows an example of a flowchart regarding updating a device information table. When the order supporting program 11 receives searched device information, the order supporting program 11 performs user authentication based on the searched device information and the user ID and the password sent from the monitor service 212 at step S331. If the user is successfully authenticated, that is "Yes" at step S331, the below-described steps S332 through S338 are conducted for each device included in the searched device information.

First, one of the devices 30 is chosen as the target for processing (hereinafter referred to as "current device") at step S333. Then, it is determined whether the current device is a device that is newly found by the searching process (hereinafter referred to as "new device") at step S334. The MAC address of the current device is used as a key in performing this determination. That is, it is determined whether an entry having the MAC address is included in the device information table 12. If there is no such entry, it is determined that the current device is a new device.

If the current device is determined as a new device, that is, "Yes" at step S334, the order supporting program 11 determines the category of the current device at step S335, so as to check the possibility of a maintenance contract for the current device. In this embodiment, the order supporting program 11 determines whether the current device is an MFP. If the current device is a not an MFP (e.g. printer, scanner, facsimile device, copier) at step S335, the order supporting program 11 registers the entry of the current device in the device information table 12 and set the current device as monitor object at step S336. That is, the monitor flag corresponding to the newly registered entry is registered as "Yes".

Since, in the searching process performed automatically, there is no suitable timing for querying the user on whether the new device is to be chosen as a monitor target, the monitor flag corresponding to the new device is automatically registered as "Yes" by the order supporting program 11. Initially, the monitor program 21 is installed for the purpose of monitoring the consumable supplies of devices 30 connected to the network 50. Thus, considering the needs of the user, it is preferable that the new device be initially designated as a monitor target. For this reason, the monitor flag corresponding to the new device is registered as "Yes" rather than "No". Furthermore, from the aspect of the ordering site, it is preferable to designate as many devices as possible as monitor targets for promoting sales of consumable supplies.

On the other hand, if the current device is determined as an MFP at step S335, the order supporting program 11 registers the entry of the current device in the device information table 12, but registers the flag "No" in the entry so that the order supporting program may not set the current device as the monitor target, at step S337. In other words, the order supporting program deselects the current device from the monitor target. Thus, the order supporting program can prevent the maintenance fee from being double charged due to the maintenance contract.

If an entry having the MAC address of the current device is already included in the device information table 12, that is, "No" at step S334, it is determined whether the vendor name and the model name of the existing entry match those of the current device at step S336. This determination is conducted considering that the identity of a device cannot be guaranteed merely by a match of the MAC address. In other words, since there may be a type of device that obtains a MAC address from a network card, it is possible that the network card has been switched for use by another device. Therefore, identification of devices performed by only relying on the MAC address of a device may be insufficient.

If at least one of the vendor name and the model name of the current device does not match that of the existing entry having a MAC address matching the MAC address of the current device, that is, "No" at step S334, the mismatching part of the existing entry is updated and the monitor flag of the entry is registered as "Yes". For example, FIG. 9 shows an example of updating the device information table 12 in case there is an entry having a mismatching model name.

More specifically, FIG. 9 shows an example of updated device information table 12. According to the device information table 12 as shown in FIG. 9, the model name of the entry listed in the fifth line is changed to a model name included in the searched device information of the current device, and the monitor flag of the entry listed in the fifth line is registered as "Yes". The monitor flag of the entry listed in the fifth line is registered as "Yes" since it is suitable to handle such a device as a new device.

On the other hand, in case an entry having a MAC address of the current device has been already registered and both the vendor name and the model name of the current device match those of the current device, that is, "No" at step S334 and S338, the current device is determined as a device corresponding to an entry that has been already registered in the device information table 12. However, if there is a change in a part of the attributes (e.g., serial number) of the existing entry, the item corresponding to the changed attribute is updated at step S340. In even this case, however, the monitor flag of the existing entry is not changed. That is, if the monitor flag of the existing entry is registered as "No", the monitor flag remains unchanged. The monitor flag registered as "No" is not automatically changed (i.e. remains unchanged) since changing the monitor flag would contradict the intention of the user having removed the device from a monitor target.

When the Steps 333 through S340 are completed for all of the devices included in the searched device information, that is, "Yes" at step S332, the order supporting program 11 sends a message to the monitor service 212 conducted in the client PC 20 for reporting that the registration of the searched device information has succeeded at step S341. Once the message is sent, the operation of the order supporting program is completed. It is noted that, if the user authentication fails at step S331, the order supporting program 11 sends an error message to the monitor service 212 without performing the updating process on the device information table 12, at step S342.

According to the description described above, the maintenance contract information is input by the user in the device information list page 240. However, for example, at step S24 as shown in FIG. 3, the order supporting program 11 may obtain the maintenance contract information regarding each device 30 included in the searched device information from an external database, and register the obtained maintenance contract information in the device information table 12 when the searched device information is registered in the device information table 12. In this situation, the monitor flag of the device 30 whose maintenance contract information is registered may be "Yes". In addition, when searching the maintenance contract information from the external database, information that can distinguish devices from each other, such as the serial number or the MAC address, may be preferable as a search key, for example. Further, it may be preferable to combine the model name and vendor name if it is difficult to assure uniqueness in using one searching key.

The order supporting program 11 creates the device information list page 240, as shown in FIG. 6, so that the maintenance contract number and the contact address can be displayed in the corresponding column, that is, in the maintenance contract number column 243 and the contact address column 244. Further, the order supporting program 11 creates the page 240 so that the user can check the checkbox column 242. When the device information list page 240 created in the manner described above is displayed by the web browser 22, the maintenance contract information is already input and the user does not have to search the maintenance contract regarding each device 30.

In addition, when the searched device information of the device 30 that is determined to be an MFP at step S337, as shown in FIG. 8, is registered in the device information table 12, the order supporting program 11 may obtain the maintenance contract information regarding each device 30 included in the searched device information from an external database, and register the obtained maintenance contract information in the device information table 12.

Further, the client PC 20 may determine whether each device is subject to the maintenance contract, instead of the order supporting server 10. For example, at step S23, as shown in FIG. 3, the monitor program 21 may determine whether each device is an MFP and send the result of the determination with the searched device information when the client PC 20 sends the searched device information to the order supporting server 10.

Figure 10B:
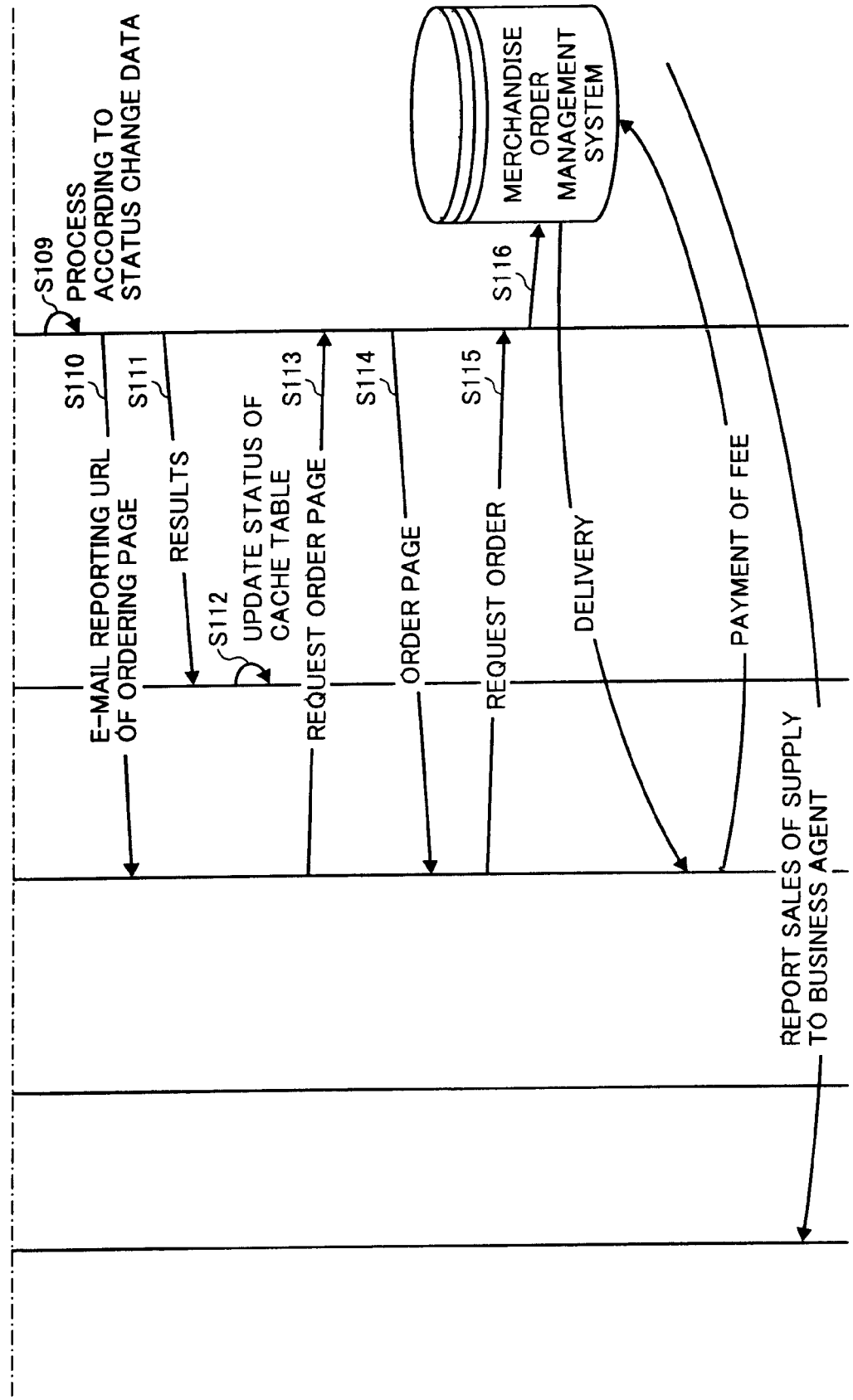

FIGS. 10A and 10B show an example of a process executed by the order supporting system 1.

At step S101, the monitor service 212 requests, from the order supporting server 10 a list of one or more devices 30 designated as a monitor target (hereinafter referred to as "monitor device"), periodically every device status monitoring period. The order supporting program 11 of the order supporting server 10 prepares the list by listing the monitor devices based on the monitor flags of the device information table 12, and sends the monitor device list to the monitor service 212 at step S102. It is to be noted that the monitor service 212 may conduct a device monitoring operation at timings other than the above-described device status monitoring period. For example, the monitor service 212 may conduct a device monitoring operation in correspondence with a user's selection from a menu.

Accordingly, the order supporting service 212 does not distinguish whether the devices 30 are the monitor targets. Instead, the order supporting service 212 distinguishes the monitor devices by querying the order supporting server 10. With such a configuration, the monitor service 212 can be easily implemented and workload can be reduced.

When the monitor service 212 receives the monitor device list, the monitor service 212 updates a cache table based on the received monitor device list at step S103. The cache table is for enabling the monitor service 212 to manage, for example, the status of the supplies of the monitor devices. The cache table may be provided in the memory of the client PC 20.

FIG. 11 shows an example of a cache table. As shown in FIG. 11, the cache table 27 registers various information such as MAC addresses, vendor names, model names, serial numbers, comments, monitor status, supply status, and notice flags corresponding to each monitor device. At step S103 described above, the monitor service 212 registers or updates MAC addresses, vendor names, model names, serial numbers, and comments based on the received monitor device list. For example, if the cache table 27 has no entry corresponding to a MAC address that matches the MAC address of a monitor device listed in the received monitor device list, the monitor service 212 newly adds an entry of the monitor device in the cache table 27. If there is an entry corresponding to a MAC address matching the MAC address of a monitor device listed in the received monitor device list but includes different information items partly, that is, different vendor name, model name, serial number, or comments, the entry including the partly different information items is updated. Furthermore, in case the cache table 27 includes an entry having a MAC address that is not included in the monitor device list, the monitor service 212 deletes the entry from the cache table 27. In other words, the cache table 27 is for storing entries corresponding to devices that are designated as monitor devices at that current time. It is to be noted that "monitor status", "supply status", and "notice flag" are items of the cache table 27 which are to be updated in a below-described process.

Then, the monitor service 212 requests for device information (i.e. MIB information) to the devices 30 corresponding to the entries of the cache table 27 by using SNMP at step S104. In this example, the MIB information includes at least status information of toner. The MIB information may also include status information of other supplies. Then, in response to the request from the monitor service 212, each device returns MIB information to the monitor service 212 at step S105.

Although the device information according to the above-described embodiment of the present invention is described as MIB information, the device information are not limited to MIB information. Furthermore, the protocol used for requesting the device information is not limited to SNMP. It is, however, preferable to use standardized technologies such as MIB and SNMP so that device information can be obtained with the same procedures even if the vendor of each device 30 is different.

After the obtaining of device information from all of the monitor devices is completed, the monitor service 212 updates the items "monitor status", "supply status", and "report flag" in the cache table 27 in accordance with the obtained device information at step S106. With respect to the item "monitor status", the monitor service 212 registers "OK" to an entry corresponding to a device from which device information is obtained, and registers "NG" to an entry corresponding to a device from which device information could not be obtained. In addition, status information of a supply (e.g., toner status information included in the obtained device information) is registered in the item "supply status".

Furthermore, "unreported" is registered in the item "report flag" if the supply status value changes. In other words, the monitor service 212 detects the change of the status of the supply by comparing the status information of the supply registered in the cache table 27 prior to the update process and the status information of the corresponding supply in the obtained device information. Accordingly, in case the monitor service 212 detects a change in the status information of a supply, the monitor service 212 registers "unreported" in the notice flag of the entry corresponding to the device having a change detected in its supply information. It is to be noted that the report flag is used for determining whether the change in the status of the supply is already reported to the order supporting program 11.

FIG. 12 shows an example of updated cache table 27 based on the results of polling for device information. The cache table 27 is updated from the state shown in FIG. 11. That is, in the entry in the first line of the cache table 27, the supply status changes from "normal" (e.g.; no shortage state)" to "near-end" (e.g.; near shortage state). Accordingly, the value of the report flag is updated to "unreported". Likewise, since the supply status of the entry in the fourth line of the cache table 27 changes from "near-end" to "end" (e.g.; shortage state), the value of the report flag is updated to "unreported".

Meanwhile, in the entries of the third and fifth lines, the values of the report flags remain unchanged since there is no change of supply status. Furthermore, in the entry of the second line, the monitor status is registered as "NG". This indicates that device information of the device corresponding to the entry could not be obtained. In this case, the supply status and the value of the report flag corresponding to the entry of the second line are not updated.

Then, the monitor service 212 generates information for reporting status change information based on the updated cache table 27 at step S107. Accordingly, the monitor service 212 generates status change information for devices corresponding to entries that have their report flag value registered as "unreported". Therefore, in the cache table 27 shown in FIG. 12, status change information for the devices corresponding to the entries of the first, third, and fourth lines are generated.

FIG. 13 shows an example of a diagram of status change information. As shown in FIG. 13, the status change information includes header information and device information.

The header information includes items such as "date & time", "user ID", and "password". The item "date & time" indicates the date and time of transferring device information. The items "user ID" and "password" are input and stored upon installing of the monitor program 21. That is, header information is not information obtained from the devices 30.

The device information represents the same meaning as the above described device information. That is, the device information is information obtained as MIB information from each device 30. The device information include, for example, vendor name, model name, serial number, MAC address, IP address, toner ID indicating information for identifying a toner bottle, toner name, toner status, toner level, toner name localized as a character string, toner name localized as code, and total counter value, for each device 30. It is to be noted that plural toner IDs are assigned one for each color when case of outputting a color image, and a single toner ID is assigned when outputting a monochrome image. These items of device information are defined as public MIB (standard MIB) that are information that can be obtained from any device regardless of the vendor.

The toner status is for indicating the status of toner. The total counter value is for indicating the total number of copies printed. Accordingly, the monitor service 212 detects the end of toner based on the toner status. Furthermore, the monitor service 212 determines wear or consumption of, for example, the photoconductor, the fixing unit, and the developer based on the total counter value. However, with the toner status of the standard MIB, the color of the toner being in an end state cannot be identified.

Therefore, the device information according to an embodiment of the present invention also includes, for example, a monochrome counter value, a color counter value, a cyan counter value, a magenta counter value, a yellow counter value, a black counter value, and a red counter value. These items of device information are defined as private MIB (extended MIB). The extended MIB is uniquely defined by the vendor.

For example, in case extended MIB information is applicable for a device 30 of manufacturer A, extended MIB information of the device 30 of manufacturer A are input to the items corresponding to the extended MIB information. In case of devices 30 of other manufacturers besides manufacturer A, no information is input to the items corresponding to the extended MIB information.

For example the monochrome counter value indicates the number of sheets printed by monochrome printing. The color counter value indicates the number of sheets printed by color printing. Furthermore, the cyan counter value, the magenta counter value, the yellow counter value, the black counter value, and the red counter value each indicate the number of sheets printing by toner of each color. Accordingly, with the device 30 of manufacturer A, the end state of toner of each color can be detected.

It is to be noted that, although a single entry is assigned to each monitor device such as in the cache table 27 shown in FIG. 12, an entry can be assigned to each supply when managing the status of plural supplies (e.g., toner status or total counter for CMYK). Furthermore, the information included in the status change information is not limited to that shown in FIG. 13. The status change information may be determined based on necessity.

Then, the monitor service 212 sends the generated status change information to the order supporting program 11 at step S108. It is to be noted that, it may be preferable to transmit the status change information for each device together as a single message for reducing the communication load. Compared to transmitting the status change information as separate messages, overhead information can be reduced.

The order supporting program 11 receiving the status change information performs various processes according to the status change information, such as updating the device information table, or determining which devices have a shortage of supplies at step S109. It is to be noted that the processes of Step S109 are described in detail below.

Then, the order supporting program 11 generates a Web page used for ordering supplies that are short (hereinafter referred to as "order page"). Then, the order supporting program 11 prepares an e-mail for reporting the shortage of the supplies (hereinafter referred to as "shortage report e-mail") and sends the shortage report e-mail to the e-mail address of the user at step S110. The shortage report e-mail includes a URL of the order page. It is to be noted that an ID is assigned to each shortage report e-mail (hereinafter referred to as "e-mail ID"). Together with the e-mail ID, information such as device identification information for identifying the device 30 corresponding to the shortage report e-mail (e.g., serial number), user identification information for identifying the user (e.g., user ID or e-mail address) and transmission date/time are stored as transmission history of the shortage report e-mail.

Figure 14:
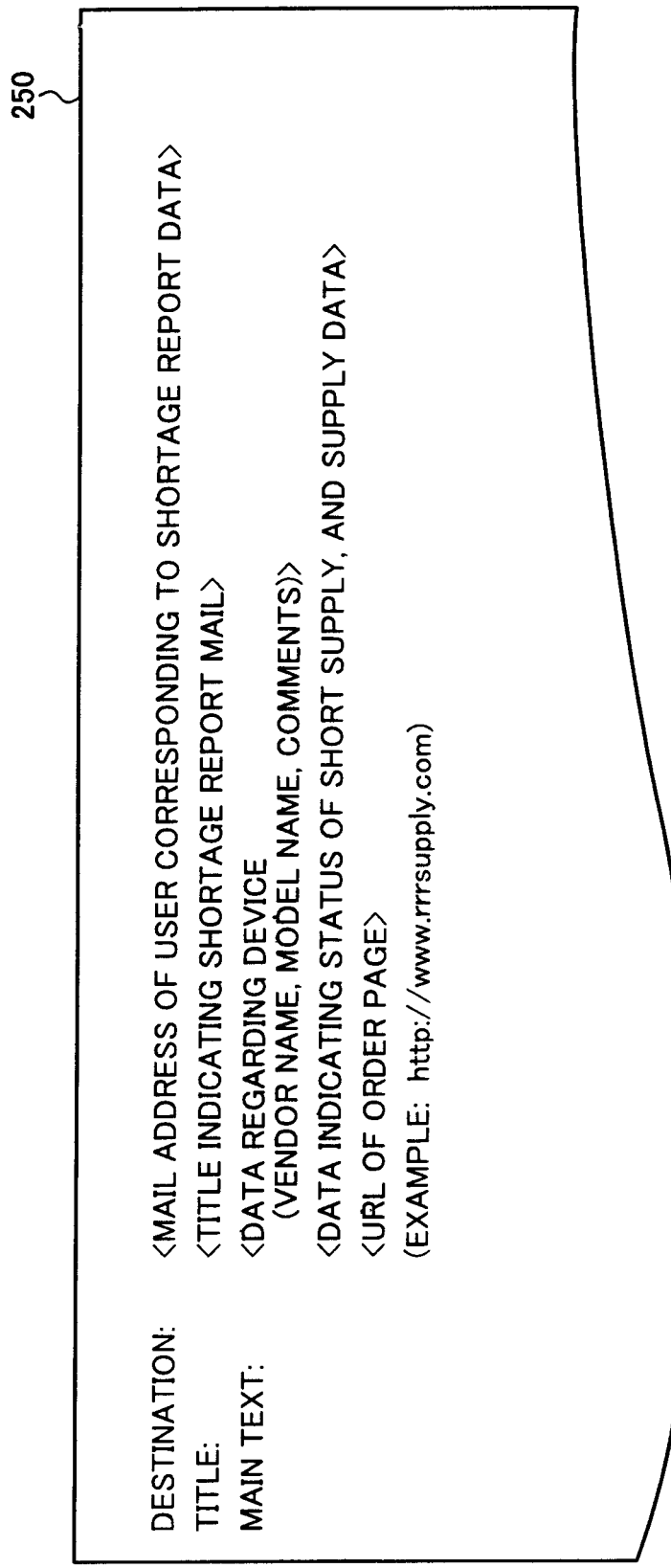
FIG. 14 shows an example of a shortage report e-mail.

FIG. 14 shows an example of the shortage report e-mail. In the shortage report e-mail 250 shown in FIG. 14, the character that is enclosed "< >" is not a concrete value but shows contents in which is described.

As shown in FIG. 14, an e-mail address of the user associated with the status change information is designated as the destination of the shortage report e-mail 250. In identifying the e-mail address of the user, the user database can be searched by using the user ID and password included in the status change information as a key, since the e-mail address is registered together with a user ID and a password upon user registration.

A title indicating that the e-mail is a shortage report e-mail is described as the title of the shortage report e-mail 250. The main text of the shortage report e-mail 250 includes, for example, device related information corresponding to status change information, short supply related information, and the URL of the order page.

The device related information includes, for example, the vendor name, the model name, and comments corresponding to the device. The device related information can be obtained by searching the device information table 12 by using, for example, the serial number, the MAC address, or the IP address included in the status change information as a key. Furthermore, the short supply information includes, for example, toner status, toner ID, toner name included in the status change information when the supply is toner. If plural supplies of a single device 30 become short at substantially the same time, a single shortage report e-mail 250 including information corresponding to the plural supplies is prepared for reporting the shortage of the plural supplies.

After the order supporting program 11 sends the shortage report e-mail 250 to the user, the order supporting program 11 sends a report indicating the results of the various processes performed according to the received status change information (e.g., transmission of shortage report e-mail 250) to the monitor service 212 at step S111. When the processes performed by the order supporting program 11 are properly completed in accordance with the status change information (i.e. processing of status change information performed properly), the monitor service 212 updates the report flags of the cache table 27 from "unreported" to "reported" at step S112.

FIG. 15 shows an updated cache table 27 from the one shown in FIG. 12 in case the status change information are properly processed. In the cache table 27, the report flags of the entries of the first, third, and fourth lines are updated from "unreported" to "reported". By updating the values of the report flags in this manner, redundantly transmitting the status change information corresponding to the supply of the properly processed status change information can be prevented. Accordingly, increasing the communication amount of information and redundantly transmitting the shortage report e-mail 250 can be prevented.

Thus, the user can confirm the shortage report e-mail 250 with the e-mailer 23 of the client PC 20 so that the shortage of supplies can be recognized even if a process (e.g., printing) is not being executed. Furthermore, by inputting, for example, the location of the device 30 in the item "comments", the location of the device can easily be identified based on the information registered in the item "comments".

When the user clicks the URL of the order page described in the shortage report e-mail 250, the e-mailer 23 activates the Web browser 22 using the URL as an argument. When the Web browser 22 is activated, the Web browser 22 sends an HTTP request to the order supporting server 10 for requesting an order page based on the URL designated by the argument at step S113. In response to the HTTP request, the order supporting program 11 returns an order page to the Web browser 22 at step S14. The Web browser 22 displays the received order page.

FIG. 16 shows an example of an order page. According to the order page 260 as shown in FIG. 16, information of the device 30 having a shortage of supplies, such as a manufacturer name (vendor name), model name, serial number, comments (location), is displayed in a space 261. Furthermore, a list of various supplies corresponding to the device 30 is displayed in a space 262 for enabling an order to be made in correspondence with each supply. That is, the product name of each supply is displayed for enabling the number of purchases to be input in correspondence with each supply. As shown in reference numeral 2621, with respect to the supply that is short, the supply is displayed in a manner having the necessary amount of the supply input beforehand. Furthermore, a link to a Web page displaying information of each product is attached to each product name. Furthermore, the past purchase history of the user is displayed in the space 263. This prevents the user from doubly purchasing the supply.

The purchase history is registered in the user database in correspondence with each user. That is, when a product is ordered through the order page 260, information of the ordered product are added to the user database.

In the order page 260 as shown in FIG. 16, it is reported that the supply of yellow toner is short. As described above, the color of the short toner cannot be determined by only using the standard MIB. Therefore, the order page 260 as shown in FIG. 16 displays the results where information registered in the extended MIB is used for determination. Accordingly, with such an order supporting system 1, the manufacturer defining its own extended MIB can differentiate its services from other manufacturers by using the extended MIB. In other words, even if a shortage of toner of another manufacturer's device is detected, the order page 260 can only report shortage of toner and cannot identify the color that is short. Although it is possible to remove supplies of other manufacturers from the order targets of the order supporting system, the order supporting system in this example can order supplies of devices 30 of other manufacturers for the convenience of the user.

When the user clicks the order button 2622 displayed on the order page 260, the Web browser 22 sends an HTTP request to the order supporting server 10 for requesting ordering of the corresponding product at step S115.

In response to the HTTP request, the order supporting program 11 records information used for granting part of the profit to the distributor associated with the user based on the requested order at step S116. More specifically, a database is prepared for managing the sales of the supplies for each distributor based on the order supporting system 1 (hereinafter referred to as "distributor database") so that the content of the requested order (e.g., cost of the order) is recorded in the sales of the distributor database. It is to be noted that an entry corresponding to the distributor is generated in the distributor information by concluding a contract for participating in the order supporting system 1 between the distributor and the manufacturer. Furthermore, a distributor ID is assigned to the distributor so that the distributor can be identified in the order supporting system based on the distributor ID. It is to be noted that, at step S116, identification of the user corresponding to the received HTTP request may be conducted, for example, by associating the session ID for the Web browser 22 and the user ID and identifying the user ID from a corresponding session ID based on the association.

The order supporting program 11 also sends an instruction to execute the requested order to a merchandise order management system 60. The instruction includes information regarding the delivery destination recorded in the user database. By instructing the merchandise order management system to execute the order, the ordered merchandise is delivered to the actual user. When the user pays the fee of the merchandise, the sale corresponding to the requested order is fixed and recorded in the distributor database. By the fix of the sale, the manufacturer may provide various benefits (e.g., sales promotion cash) to the distributor based on the sale. Further, the merchandise order management system 60 may be embedded in the order supporting server 10.

Figure 17:
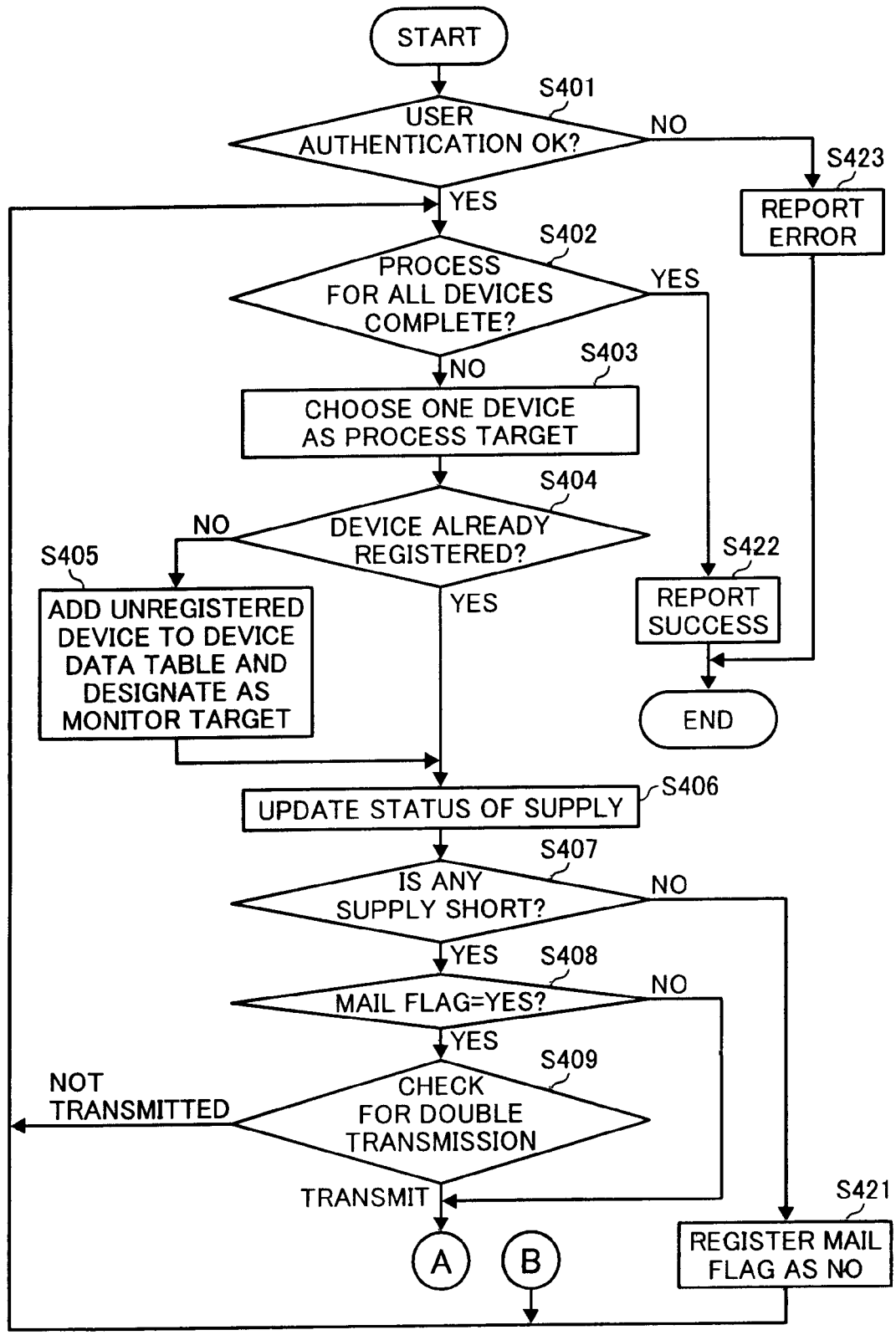
FIG. 17 shows an example of a flowchart executed by an order supporting server.

Next, the operation at step S109 as shown in FIG. 10 is described in further detail. FIG. 17 shows an example of a flowchart executed by the order supporting program 11 based on status change information.

When the order supporting program 11 receives status change information, the order supporting program 11 performs user authentication based on the received status change report information along with the user ID and password sent from the monitor service 212 at step S401. When user authentication is successful, that is, "Yes" at step S401, step S402 and the steps thereafter are performed on each device corresponding to the received status change information.

First, a device is chosen as a process target (hereinafter the device chosen as the process target is referred to as "current device") at step S403. The order supporting program 11 determines whether the current device is registered in the device information table 12 at step S404. In the determination, the MAC address of the current device is used as a key for determining whether there is an entry having the same MAC address in the device information table 12. If the current device is not registered, that is "No" at step S404, an entry of the current device is newly registered in the device information table 12 at step S405. At this step, the current device is designated as a monitor target. It is to be noted that, if the current device is registered according to its MAC address, the steps S338-S340 shown in FIG. 8 may be performed.

Then, status information of the supplies of the current information included in the status change information is reflected to the status in the device information table 12 at step S406. Then, it is determined whether there are any devices having short supplies (i.e., supplies having a "Ne" (Near-End) status or a "E" (End) status) based on the status of the current device registered in the device information table 12 at step S407. In case a supply of the current device is short, that is, "Yes" at step S407, the order supporting program 11 refers to the device information table 12 and determines whether the value of the e-mail flag of the entry of the current device (hereinafter referred to as "current entry") is registered as "Yes" at step S408. In this embodiment, the e-mail flag is registered as "Yes" when a shortage report e-mail 250 is sent. In other words, the value of the e-mail flag registered as "Yes" indicates that a shortage report e-mail 250 corresponding to the current device has been sent previously or in the past.

Figure 18:
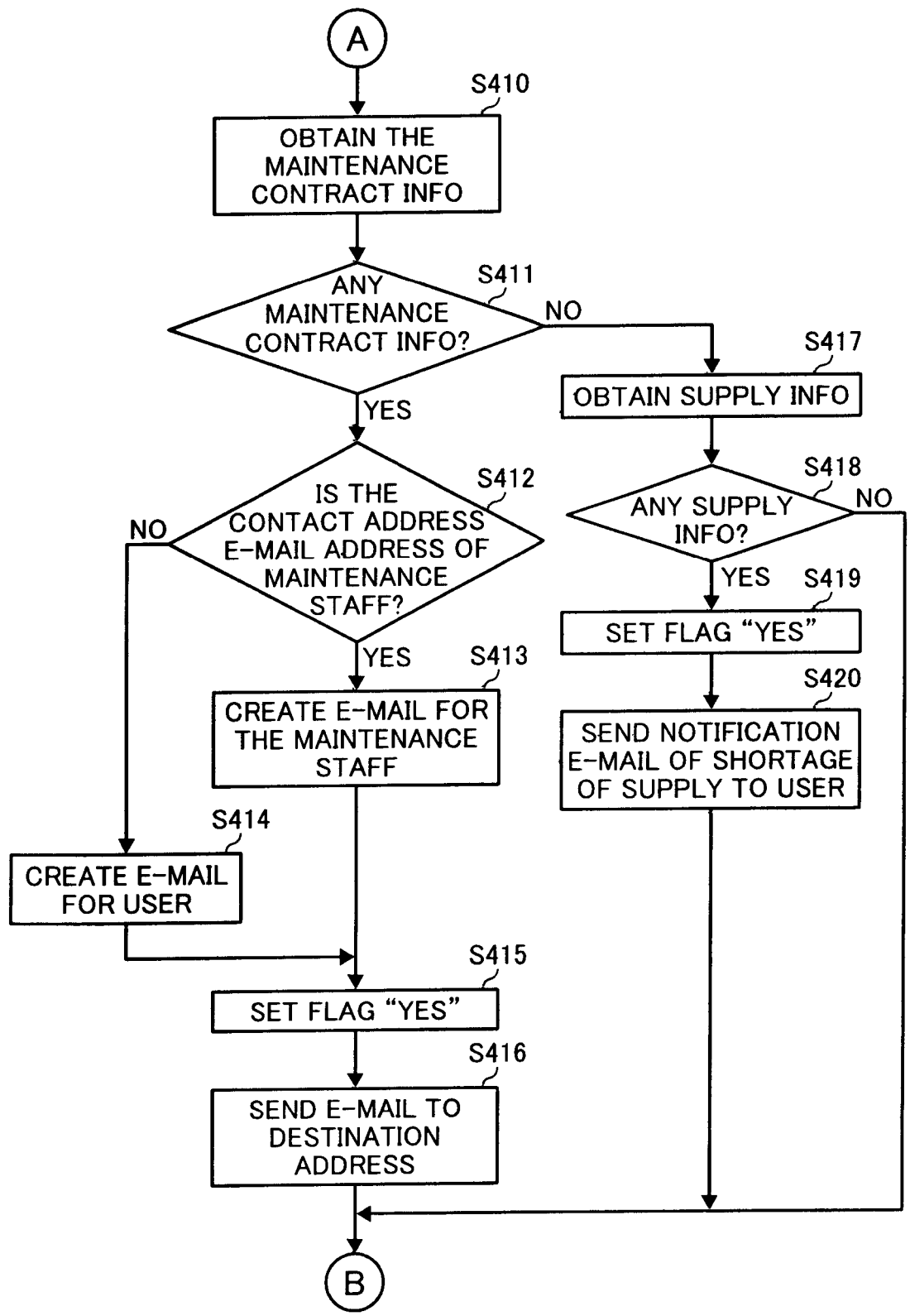
FIG. 18 shows an example of a flowchart executed by an order supporting server.

If the e-mail flag is "Yes" at step S408, the order supporting program 11 checks for double transmission of the shortage report e-mail 250 at step S409. In this embodiment, the checking of double transmission is a process for determining whether a shortage report e-mail 250 of the same content has been redundantly sent. This process will be described below. In the double transmission check, if it is determined that the shortage report e-mail 250 is sent at step S409, the process proceeds to step S410 as shown in FIG. 18, and the order supporting program 11 obtains the maintenance contract information from the current entry. However, the order supporting program 11 may obtain the maintenance contract information from the external database described above. In this case, the maintenance contract information may not necessarily register in the device information table 12 before at step S412.

If least one of the maintenance contract number and contact address is obtained at step S411, the order supporting program 11 determines whether the contact address is an e-mail address, at step S412. It may be possible to determine whether the contact address is an e-mail address or not based on whether an e-mail address such as "@" (at mark) is included in the character.

If the contact address is an e-mail address, that is, "Yes" at step S412, the order supporting program 11 creates a maintenance information e-mail for the maintenance staff at step S413.

Figure 19:
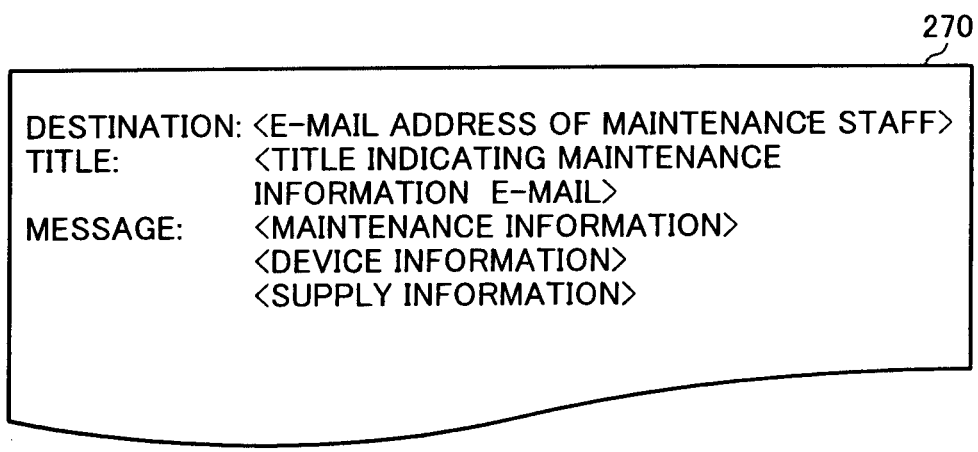
FIG. 19 shows an example of a maintenance information e-mail for a maintenance staff.

FIG. 19 shows an example of the maintenance information e-mail for the maintenance staff. In this maintenance information e-mail 270, the character that is enclosed "< >" is not a concrete value, but shows descriptive contents. As shown in FIG. 19, an e-mail address of the maintenance staff is designated as the destination for the maintenance information e-mail 270. In the title, title information indicating that this e-mail is the maintenance information e-mail is described. In the message, the device information, supply information regarding supplies in shortage, and maintenance contract information is described.

On the other hand, if the contact address is not an e-mail address or the contact address is not registered, that is, "No" at step S412, the order supporting program 11 creates an e-mail for the user at step S414.

Figure 20:
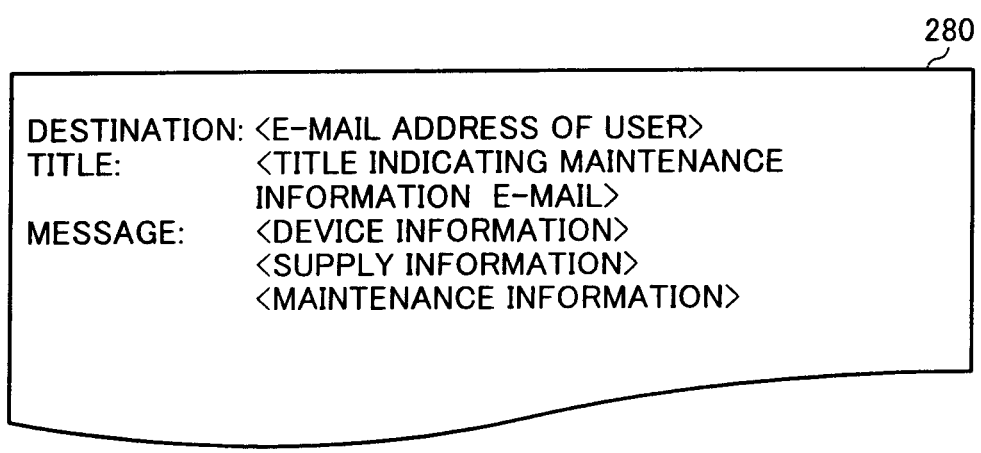
FIG. 20 shows an example of maintenance information e-mail for a user.

FIG. 20 shows an example of the maintenance information e-mail for the user. In this maintenance information e-mail 280, the character that is enclosed "<>" is not a concrete value, but shows descriptive contents. As shown in FIG. 20, an e-mail address of the user is designated as the destination for the maintenance e-mail 280. Regarding designating an e-mail address of the user, the order supporting program 11 may search the user data base described above by using a user ID and password as the search key included in the status change information. In the title, title information indicating that this e-mail is the maintenance information e-mail is described. In the message, the device information, supply information regarding supplies in shortage, and maintenance contract information is described. The order supporting program 11 set the e-mail flag "Yes" at step S415 after step S413 or S414.

Thus, the maintenance information e-mail 270 or 280 that informs the maintenance staff or the user of the maintenance contract information and the supply shortage is sent to the maintenance staff or the user, regarding the device 30 that is conducted in the maintenance contract. Therefore, the maintenance staff or the user can recognize whether the supply regarding the device 30 is in shortage by referring to the maintenance information e-mail 270 or 280. If the maintenance information e-mail 270 is sent, the maintenance staff can perform service adequately for the user by contacting the user and change or refill the supply according to the e-mail 270. If the maintenance information e-mail 280 is sent, the user can have the maintenance staff change or refill the supply by contacting the maintenance staff according to the e-mail 280. Further, since the maintenance information e-mail 270 and 280 does not include the URL for the order page 260, the supply is not ordered by the order page 260. Therefore, the order supporting program can prevent the double charging of the supply fee.

On the other hand, at step S411, if the maintenance contract number and contact address is not registered in the current entry, the order supporting program 11 searches supply shortage information indicating the supply in shortage in a supply information table 13 at step S417. Further, the order supporting program 11 determines whether the supply shortage information is registered in the supply information table 13 at step S418. The supply information table 13 is a table that registers information of supply subject to the service in the order supporting system 1, and is stored in a storage device in the order supporting server 10. In the supply information table 13, the supply information regarding the device that may be subject to the maintenance contract is not registered to avoid duplication between the order supporting system 1 and the maintenance contract. That is, the determination process at step S418, when the maintenance contract information of the current device is not registered, but the current device is a monitor target, the order supporting program 11 determines the possibility of the maintenance contract for the current device.

If the order supporting program 11 determines that supply shortage information is registered in the supply information table 13 at step S413, it is not likely that the current device is subject to the maintenance contract. Therefore, the order supporting program 11 sets the e-mail flag "Yes" at step S419 and sends the shortage report e-mail 250 to the user at step S420. Meanwhile, in case of determining a plurality of supplies in shortage at step S407, one shortage report e-mail 250 that describes the plurality of supplies may be sent to the user.

On the other hand, if the shortage supply information is not registered in the supply information table 13, the order supporting program 11 does not send the shortage report e-mail 250 to the user because it is likely that the current device is subject to the maintenance contract. Therefore, the order supporting program can prevent the double charging of the supply fee.

In FIG. 17, at step S409, if the order supporting program 11 determines not to transmit the shortage report e-mail 250, the order supporting program 11 ends the process regarding the current device without sending the e-mail 250.

On the other hand, if the e-mail flag is not registered as "Yes" at step S408, there is no possibility of double transmission and the e-mail flag is registered as "Yes" without checking for double transmission at step S419, and a shortage report e-mail is sent at step S420.

In addition, if the order supporting program 11 determines that there is no shortage of supplies for the current device at step S407, there is no need to transmit a shortage report e-mail 250. Accordingly, the e-mail flag is registered as "No" at step S421. Thus, the process for the current device is finished without transmitting the shortage supply e-mail.

When the processes performed in the above-described Steps S403-S421 are completed for all of the devices corresponding to the status change information, that is, "Yes" at step S402, the order supporting program 11 sends a message to the monitor service 212 indicating that the status change information has been processed at step S422, and ends the process. If the user authentication fails at step S401, a message indicating an error is sent to the monitor service 212 without updating the device information table 12 at step S423.

Figure 21:
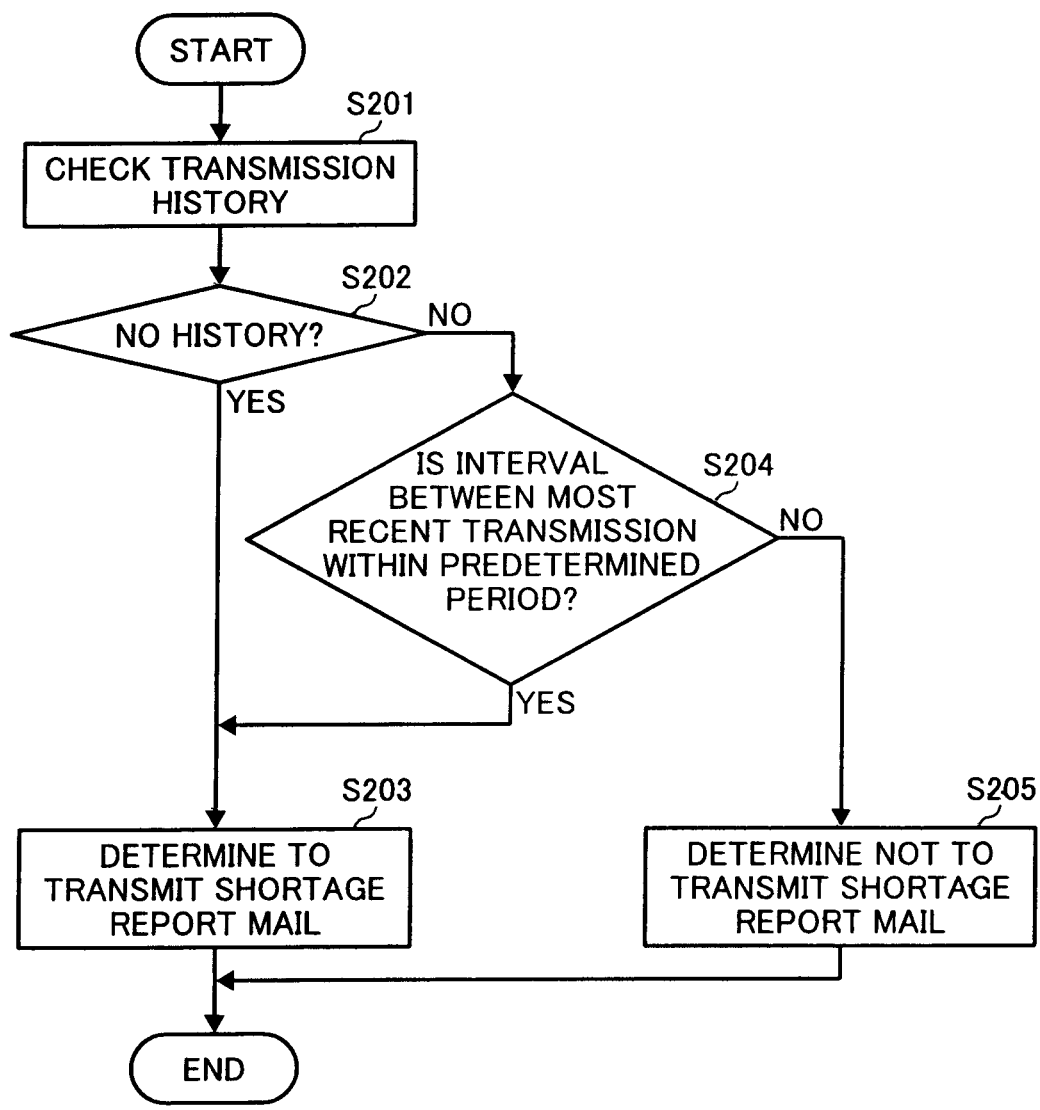
FIG. 21 shows an example of a flowchart regarding checking redundant sending of the shortage report e-mail.

Next, an operation of S409 shown in FIG. 17 is described in further detail. FIG. 21 shows an example of flowchart of checking redundant sending of shortage report e-mail.

Since the monitor service 212 sends the status change information based on the report flags of the cache table 27, the monitor service 212 does not redundantly send status change information of the same content. However, if the supply is toner, the exhaustion of toner may be detected even though some toner is still remaining in the toner bottle. When the toner bottle is mounted again after the user shakes the toner bottle, the exhaustion of toner may be detected again after some while with respect to the same toner bottle. In this situation, the report flag first changes from "end" to "normal" and then changes to "end" even though the toner bottle is actually not yet replaced. The monitor service 212 may nevertheless redundantly send status change information for reporting exhaustion of toner. This causes a shortage report e-mail 250 to be redundantly sent to the user. Unless the user recognizes this redundancy, the user is likely to inadvertently make a second order for the same toner bottle. In order to prevent this from occurring, the order supporting program 11 is configured to perform the below-described processes.

First, the order supporting program 121 refers to a serial number of the device 30 included in the status change information received from the monitor service 212 and checks the most recent time and date of transmitting a shortage report e-mail of the device 30 according to the transmission history of the shortage report e-mail at step S201.

If there is no record indicating transmission of a shortage report e-mail corresponding to the device 30 in the transmission history of the shortage report e-mail at step S202, the order supporting program 11 determines to transmit the shortage report e-mail at step S203. This is because the shortage report e-mail corresponding to the device 30 has not yet been sent. Thus, it is unlikely that the shortage report e-mail will be sent redundantly.

If there is a record indicating transmission of a shortage report e-mail corresponding to the device 30 at step S202, the order supporting program 11 determines whether a predetermined time has elapsed since the most recent transmission at step S204. If a predetermined time has elapsed, the order supporting program 11 determines to transmit the shortage report e-mail at step S203. On the other hand, if a predetermined time has not elapsed, the order supporting program 11 determines not to transmit the shortage report e-mail since there is a possibility that the transmission of the shortage report e-mail would be redundant at step S205.

In FIG. 21, although the above-described process of checking for redundant transmission of shortage report e-mail is performed by referring to the passing of time, the process may alternatively be performed by referring to a total counter recorded as the transmission history. In this case, the order supporting program 11 may determine not to transmit a shortage report e-mail when a difference with respect to the total counter is no greater than a predetermined threshold. Alternatively, the transmission history of the shortage report e-mail may be periodically deleted whenever a predetermined time elapses. Accordingly, the order supporting program 11 may determine not to transmit a shortage report e-mail if a shortage report e-mail corresponding to the same device 30 is included in the transmission history.

Next, functions of the UI application 211 of the monitor program 21 are described. The UI application 211 is a program for displaying information including the various settings (e.g., period for obtaining device information) of the monitor service 212 on a screen (hereinafter referred to as "setting screen") or displaying a screen indicating monitor information of the devices 30 obtained from the monitor service 212 (hereinafter referred to as "monitoring screen").

Figure 22:
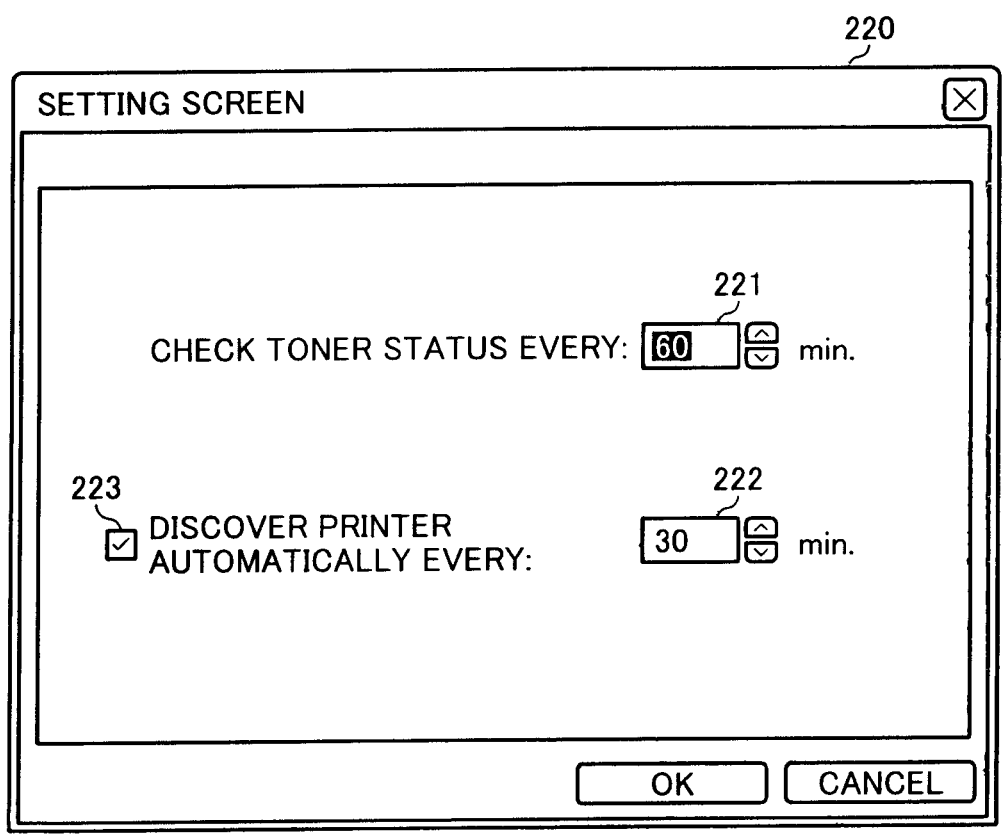
FIG. 22 shows an example of a setting screen.

FIG. 22 shows an example of the setting screen the UI application 211 displays in accordance with the instruction by the user. In the setting screen 220 shown in FIG. 22, the monitor service 212 may be set to periodically obtain device information from the monitor devices (indicated with reference numeral 221 of FIG. 22) or to automatically search (discover) devices in the network 50 (indicated with reference numeral 222 of FIG. 22). The former corresponds to a period for conducting the process in Step S104 of FIG. 10. The latter corresponds to a period for conducting the process in Step S31 of FIG. 3. It is to be noted that the settings for the latter case may be invalidated with the check box 223. That is, the automatic searching for devices 30 is not conducted in case the check-mark in the check box is removed.

Figure 23:
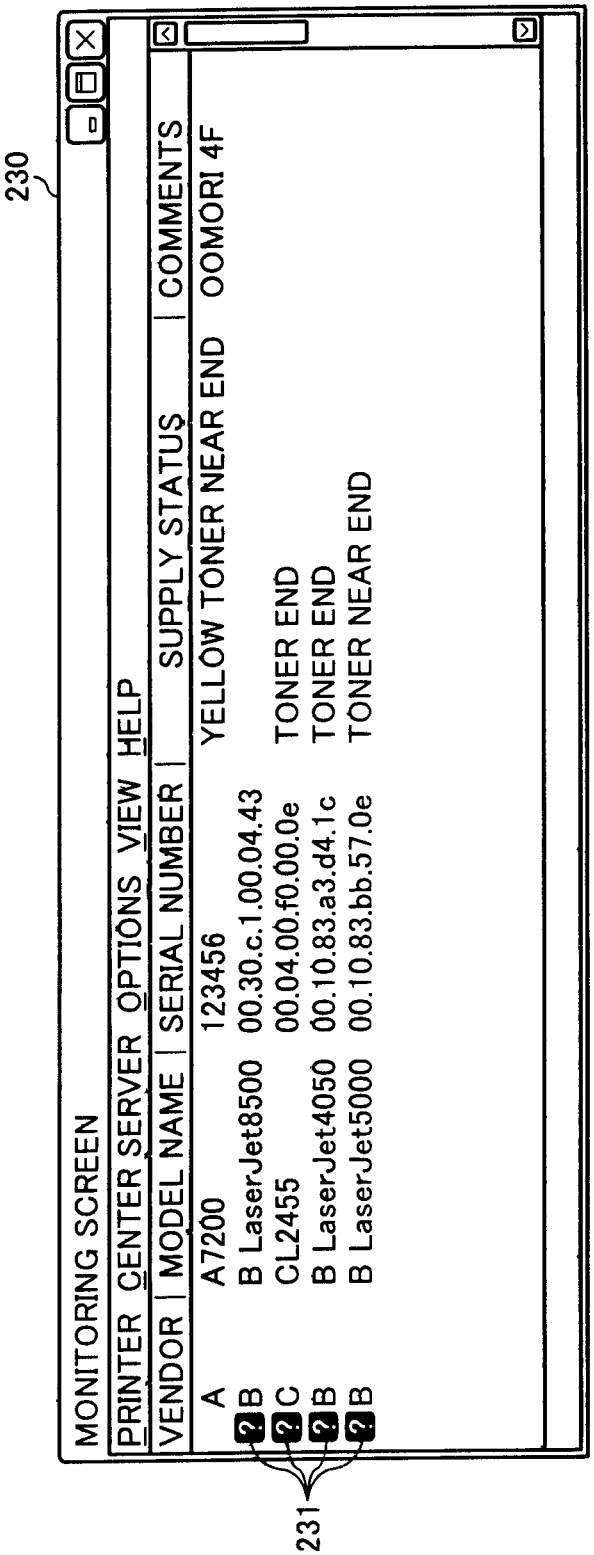
FIG. 23 shows an example of a monitoring screen.

FIG. 23 shows an example of the monitoring screen the UI application 211 displays in accordance with the instruction by the user. The monitoring screen 230 is for displaying information obtained from the cache table 27 by the UI application 211. Therefore, the information managed in the cache table 27 (i.e. vendor name, model name, serial number, supply status, comments, etc. corresponding to each device 30) is displayed. With the monitoring screen 230, the user can confirm the status of the supplies of each monitor device at a given timing. The question mark "?" denoted with reference numeral 231 in FIG. 23 indicates failure in obtaining device information of the devices corresponding to the question marks. For example, these question marks may appear in case the monitor device 30 is not yet activated or the device 30 is disconnected from the network 50.

With the order supporting system 1 described above, convenience and profitability can be attained for the user of the devices 30, the distributor of the devices 30, and the manufacturer of the devices 30.

A computer readable program according to the present invention causes a computer to carry out the processes described above. More particularly, the computer readable program causes the computer to function as an apparatus such as the order supporting server 10 or client PC 20. The effects of the embodiments described above can be obtained by causing the computer to operate in this manner by the computer readable program.

A computer readable storage medium according to the present invention stores the computer readable program described above. Any recording media capable of storing the computer readable program in a computer readable manner may form a computer readable storage medium.

The computer readable program may be prestored in a storage part or means within the computer, such as the ROM and the HDD. On the other hand, the computer readable program may be stored in a non-volatile recording medium or memory, such as a CD-ROM, flexible disk, a SRAM, an EEPROM, a memory card, a magnetic recording medium, an optical recording medium and a magneto-optical recording medium. The computer-readable program stored in the non-volatile recording medium or memory may be installed into the computer and executed by the CPU or, the CPU may read the computer-readable program from the non-volatile recording medium or memory and execute the computer-readable program, so as to realize the functions of any of the embodiments and modifications described above.

Of course, the computer-readable program may be executed by downloading the computer-readable program from an external equipment that is provided with a recording medium recorded with the computer-readable program or, from an external equipment having a storage part or means stored with the computer-readable program.

We claim:

1. An order supporting system, comprising:
a monitoring apparatus including
a determination of supply status part configured to determine a supply status of a plurality of devices in a device network; and
a sending part configured to send supply shortage information regarding at least one of the devices determined to have a supply shortage to an order supporting apparatus connected over a communication network; and
the order supporting apparatus including
a device information storage part configured to store device information describing whether each device is monitored as a monitoring target, and maintenance contract information of each device;
a determination of device subject part configured to determine, based on the device information, whether each device is subject to the maintenance contract when the order supporting apparatus receives the supply shortage information; and
an e-mail creating part configured to create a maintenance information e-mail regarding a device subject to the maintenance contract and determined to have the supply shortage by the monitoring apparatus, wherein the e-mail describes the maintenance contract information and supply shortage information of the device, and the maintenance information e-mail includes a URL of an order page, wherein the determination of device subject part deselects, in the device information, a device as the monitoring target when the device is determined to have a supply shortage by the monitoring apparatus, wherein the deselected device is not monitored by the monitoring apparatus.

* * * * *